United States Patent [19]

Akiyama et al.

[11] 4,347,570
[45] Aug. 31, 1982

[54] METHOD AND APPARATUS FOR CONTROLLING IGNITION COIL ENERGIZATION

[75] Inventors: Susumu Akiyama, Kariya; Kenzo Ito, Okazaki; Hiroyasu Fukaya, Nagoya; Haruhiko Ogiso, Kariya; Yuji Hirabayashi, Aichi; Takahide Kawamura, Kariya, all of Japan

[73] Assignees: Nippondenso Co., Ltd., Kariya; Toyota Jidosha Kogyo Kabushiki Kaisha, Toyoto, both of Japan

[21] Appl. No.: 103,942

[22] Filed: Dec. 14, 1979

[30] Foreign Application Priority Data

Dec. 18, 1978 [JP] Japan .................... 53-157782

[51] Int. Cl.³ .................... F02P 5/08; F02P 3/02; F02B 5/02
[52] U.S. Cl. .................... 364/431.04; 123/417; 123/571; 123/602; 123/609; 364/431.06; 364/569
[58] Field of Search ............ 364/431; 123/416, 417, 123/480, 486, 487, 489, 568, 609

[56] References Cited

U.S. PATENT DOCUMENTS

| | | | |
|---|---|---|---|
| 4,142,493 | 3/1979 | Schira et al. | 123/486 X |
| 4,201,159 | 5/1980 | Kawai et al. | 123/486 X |
| 4,236,214 | 11/1980 | Sasayama | 364/431 |
| 4,257,377 | 3/1981 | Kinugawa et al. | 123/480 X |
| 4,258,683 | 3/1981 | Hattori et al. | 123/416 |
| 4,259,723 | 3/1981 | Fujisawa et al. | 123/416 X |
| 4,265,211 | 5/1981 | Meloeny | 123/609 X |
| 4,266,518 | 5/1981 | Nishida et al. | 123/416 |
| 4,273,089 | 6/1981 | Maier | 123/416 X |

FOREIGN PATENT DOCUMENTS 2845352 5/1979 Fed. Rep. of Germany ...... 364/431

OTHER PUBLICATIONS

Randall et al.: Closed Loop Control of Internal Combustion Engine, Stanford University Technical Report, May 1976.

Primary Examiner—Felix D. Gruber
Attorney, Agent, or Firm—Cushman, Darby & Cushman

[57] ABSTRACT

An engine control method and apparatus generally applicable to those control systems of the engine such as an ignition system, fuel injection system, etc., which are controlled to optimum operation in accordance with the engine operating conditions. In this method, an operation starting timing and an operation ending timing of the control system, e.g., in the case of the ignition system, an ignition coil energization starting timing and an ignition timing (an energization ending timing) are computed at each of predetermined computing cycles, and the latest computed ignition timing, for example, which is computed after the coil energization has been started, further taking into consideration the actual coil energization timing and a minimum required energization period is compared with an ignition timing computed in the preceding computing cycle, and a corrective computation of the latest computed ignition timing is carried out depending on the result of the comparison to obtain an optimum ignition timing.

5 Claims, 31 Drawing Figures

FIG. 14
| INTERRUPT | LEVEL |
|---|---|
| GEAR INTERRUPT | 1 |
| PROGRAM INTERRUPT | 2 |
| 8ms INTERRUPT | 3 |
INTERRUPTS & THEIR PRIORITY LEVELS
FIG. 15
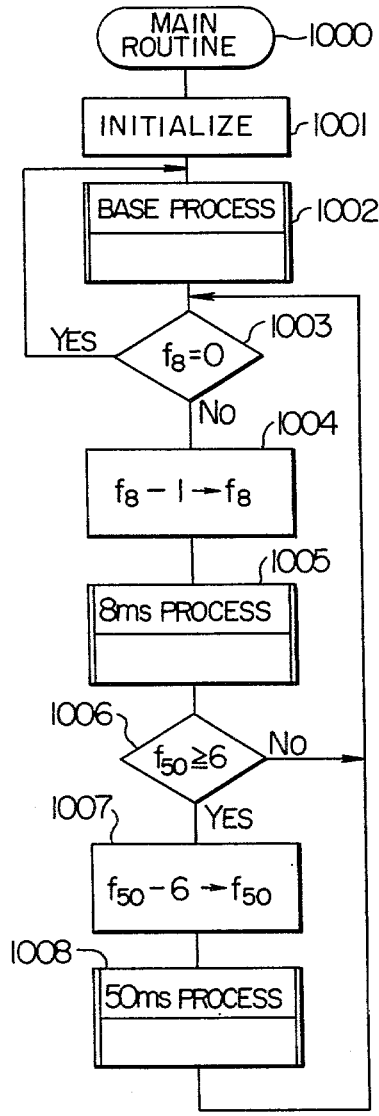
FIG. 16
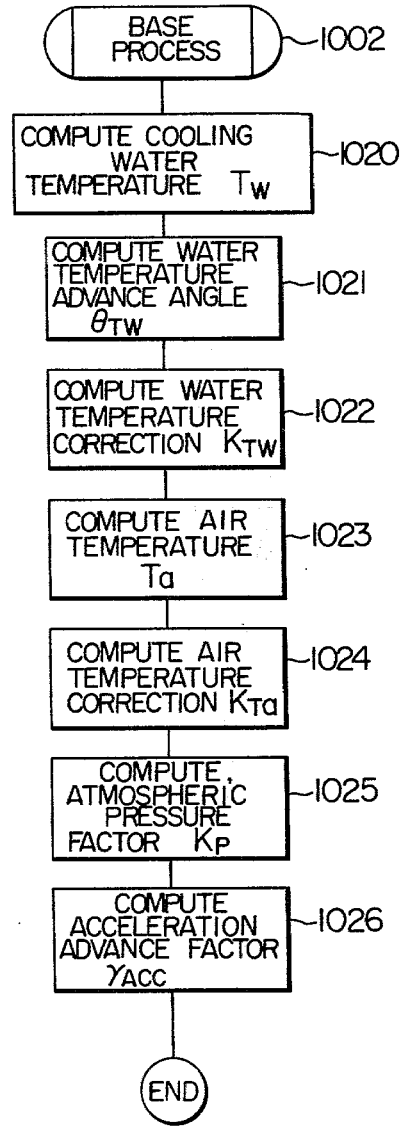

METHOD AND APPARATUS FOR CONTROLLING IGNITION COIL ENERGIZATION

BACKGROUND OF THE INVENTION

This invention relates to an engine control method and apparatus whereby in response to the operating conditions of an engine, a microcomputer computes the optimum value for an engine component part to be controlled (controlled system), such as an ignition system and the engine is controlled in accordance with the result of the computation.

Generally, known methods for controlling the ignition system of an engine through a microcomputer are so designed that the energization period of the ignition coil of the ignition system (or the energization starting timing) and the time to effect the ignition (or the energization stopping time) are each computed once in terms of crank angle degrees so as to control the energization period and the ignition timing of the ignition system for a plurality of times, and the computation of ignition timing is never effected anew during the time that the ignition coil is being energized. As a result, when the engine rotational speed changes abruptly such as during the acceleration or deceleration period of the engine, despite the need to set the ignition timing to a computed value based on the later engine data, the desired computation based on the change in the engine speed cannot be effected with the resulting disadvantage that it is impossible to produce a satisfactory power output as well as a satisfactory exhaust gas composition.

It has also been found that even though the computation of energization period and ignition timing is performed many times for every engine revolution and a new control value for the ignition timing is computed and set in the ignition system while the ignition coil is being energized so as to control the ignition timing, the ignition coil is already being energized in accordance with the computed value determining the energization period with the result that if the newly computed value of the ignition timing differs greatly from the previously computed value, the actual energization period will vary greatly from the previous energization period and consequently such abnormal combustions as engine misfiring and the like will be caused, if the ignition coil fails to store a sufficient electrical ignition energy.

SUMMARY OF THE INVENTION

With a view to overcoming the foregoing deficiencies in the prior art, it is an object of this invention to provide an ignition timing control system in which, after an ignition coil has been energized, an optimum coil deenergization time is determined. This determination may occur once or many times between coil energization and deenergization. In the preferred embodiment, this optimum deenergization time determination includes a calculation of the deenergization time from engine conditions. To optimize this calculated deenergization time, upon each calculation occurring after energization, this time is adjusted if necessary, in view of the actual energization time, so that the coil will be energized for at least a predetermined minimum period. Thus the present invention not only provides extremely fresh deenergization time data employing engine conditions after the ignition coil has been energized, but also prevents the period of energization from dropping below a minimum, in view of the actual energization time, to prevent the possibility of misfiring.

It is another object of the invention to provide an apparatus for measuring the time of rotation of a rotating member in a device mounted in an automotive vehicle, the apparatus comprising a rotational angle sensor for generating a plurality of rotational angle signals each corresponding to a predetermined angle for every revolution of the rotating member, real-time timer circuit means for counting clock signals of a fixed frequency, latch circuit means for temporarily storing the count value or the time data of the real-time timer circuit means in synchronism with selected one of the rotational angle signals, and a microcomputer whereby in accordance with a predetermined program the time data temporarily stored in the latch circuit means is read in and stored and the time difference between a predetermined angle and another predetermined angle of the rotating member is computed in accordance with the stored time data, thereby greatly simplifying the circuit construction.

It is still another object of the invention to provide a method for controlling a duty cycle of an on-off operation type electromagnetic valve, which valve may, for example, be a bleed valve in an engine air supply system. A CPU computes a desired duty cycle for the valve. Also, a history is maintained of the on-off condition of the valve over a predetermined number of previous cycles. Whether the electromagnetic valve is to be turned on or off is determined by the CPU in accordance with whether the duty cycle of the electromagnetic valve in the history is greater or smaller than the desired duty cycle, thus directly commanding the on-off control of the electromagnetic valve from the CPU with the resulting simplification of the circuit construction and improvement in the control response of the electromagnetic valve.

It is still another object of the invention to provide an engine control method whereby in accordance with the conditions of an engine the central processing unit or CPU of a microcomputer computes the time of starting operation and the time of completing operation of the component part to be controlled including the ignition system or the fuel injection system and the thus obtained computed value is set in counter circuit means which in turn counts for controlling purposes. The crank position of the engine is determined by the CPU and the time of starting counting in the counter circuit means is controlled in accordance with the determination result, thus simplifying the circuit construction.

BRIEF DESCRIPTION OF THE DRAWINGS

FIG. 14 is a diagram useful for explaining the operation of the central processing unit (CPU) shown in FIG. 2.

FIGS. 15 to 29 are flow charts showing the details of the program for the CPU shown in FIG. 2.

DESCRIPTION OF THE PREFERRED EMBODIMENTS

The invention will now be described in greater detail with reference to the illustrated embodiments.

Figure 1:
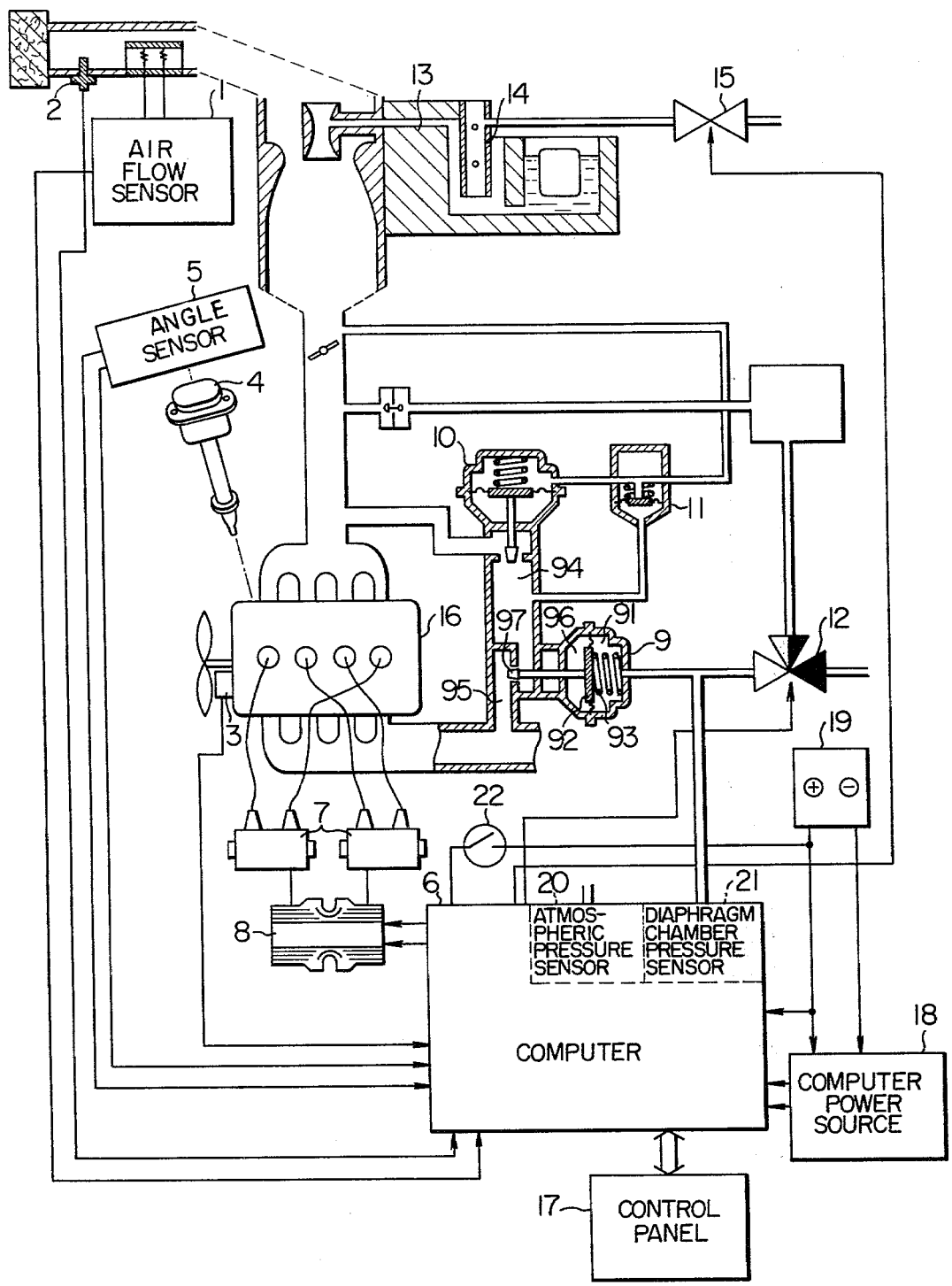
FIG. 1 is a schematic block diagram showing the construction of an embodiment of this invention.

Referring first to FIG. 1, there is illustrated a schematic block diagram showing the overall construction of an embodiment of the invention which is used in the operation of a four cylinder engine. In the Figure, numeral 1 designates an air flow sensor for detecting the amount of air flow to an engine 16 and the sensor 1 may for example be of the hot-wire type. Numeral 2 designates an air temperature sensor, and 3 a water temperature sensor for detecting the temperature of the engine cooling water. Numeral 13 designates a carburetor for controlling the air-fuel ratio of mixtures by controlling the amount of air flow through an air bleed 14 in response to the opening and closing of an air bleed solenoid valve 15 which is turned on and off by the command from a microcomputer 6. Numerals 9 to 12 designate means for accomplishing the desired exhaust gas recirculation (EGR) of a constant rate type, with numeral 11 designating a vacuum modulator, 10 a first valve for EGR and 9 a second valve for EGR. Numeral 4 designates a signal generator which is similar to a conventional distributor in that it rotates once for every two revolutions of the engine crankshaft. However signal generator 4 comprises a rotational angle sensor 5 mounted in the housing. The computer 6 is responsive to the outputs of the angle sensor 5 and the air flow sensor 6 and detects the condition of the engine, whereby the then current optimum EGR rate (the EGR quantity/total gas quantity in the cylinders) is read out from an internal memory (ROM), subjected to an interpolation computation and then corrected in accordance with the output values of the air temperature sensor 2, the water temperature sensor 3 and an atmospheric pressure sensor 20 mounted within the computer. In order to attain the thus corrected EGR by means of the illustrated EGR system, the desired feedback control is accomplished in such a manner that an EGR vacuum switching valve or VSV 12 is turned on (to introduce the vacuum) or off (to introduce the atmospheric air) so that the pressure in a diaphragm chamber 91 of the second EGR valve 9 assumes a computed value corresponding to the desired optimum EGR rate. The second EGR valve 9 includes an atmospheric air chamber 96 communicating with the atmosphere so that in response to the difference in pressure between the atmospheric air chamber 96 and the diaphragm chamber 91, a diaphragm 92 which is integral with a valve 97 is moved to a position balanced against the spring force of a spring 93 and consequently the valve 97 is moved to the right in FIG. 1, thus introducing the exhaust gas into the intake manifold through a constant pressure chamber 94 from an exhaust passage 95 connected to the exhaust manifold. The pressure in the constant pressure chamber 94 is maintained at substantially a constant pressure (the atmospheric pressure) by the action of the first EGR valve 10 and the vacuum modulator 11. Numeral 21 designates a diaphragm chamber pressure sensor mounted inside the computer for detecting the actual EGR rate or the pressure in the diaphragm chamber 91 of the second EGR valve 9. In this embodiment, the ignition system is of the distributorless double coil type employing two coils in place of the conventional high-tension distributor, and numeral 8 designates an igniter, 7 ignition coils. The computer 6 detects the condition of the engine from the outputs of the angle sensor 5 and the air flow sensor 1 so that the then current optimum ignition angle is read out from the internal memory (ROM), subjected to an interpolation computation and corrected in accordance with the value of the water temperature sensor, the warming-up acceleration condition and the EGR rate. In response to the battery voltage the energization period is read out from the ROM and subjected to an interpolation computation. In accordance with the computation result, the computer 6 controls in real time the actual ignition timing and energization timing in reference to the signal from the angle sensor 5. Numeral 16 designates the engine, 17 a control panel for the computer 6, 18 a computer power source, 19 a battery, and 22 a starter switch.

Figure 2:
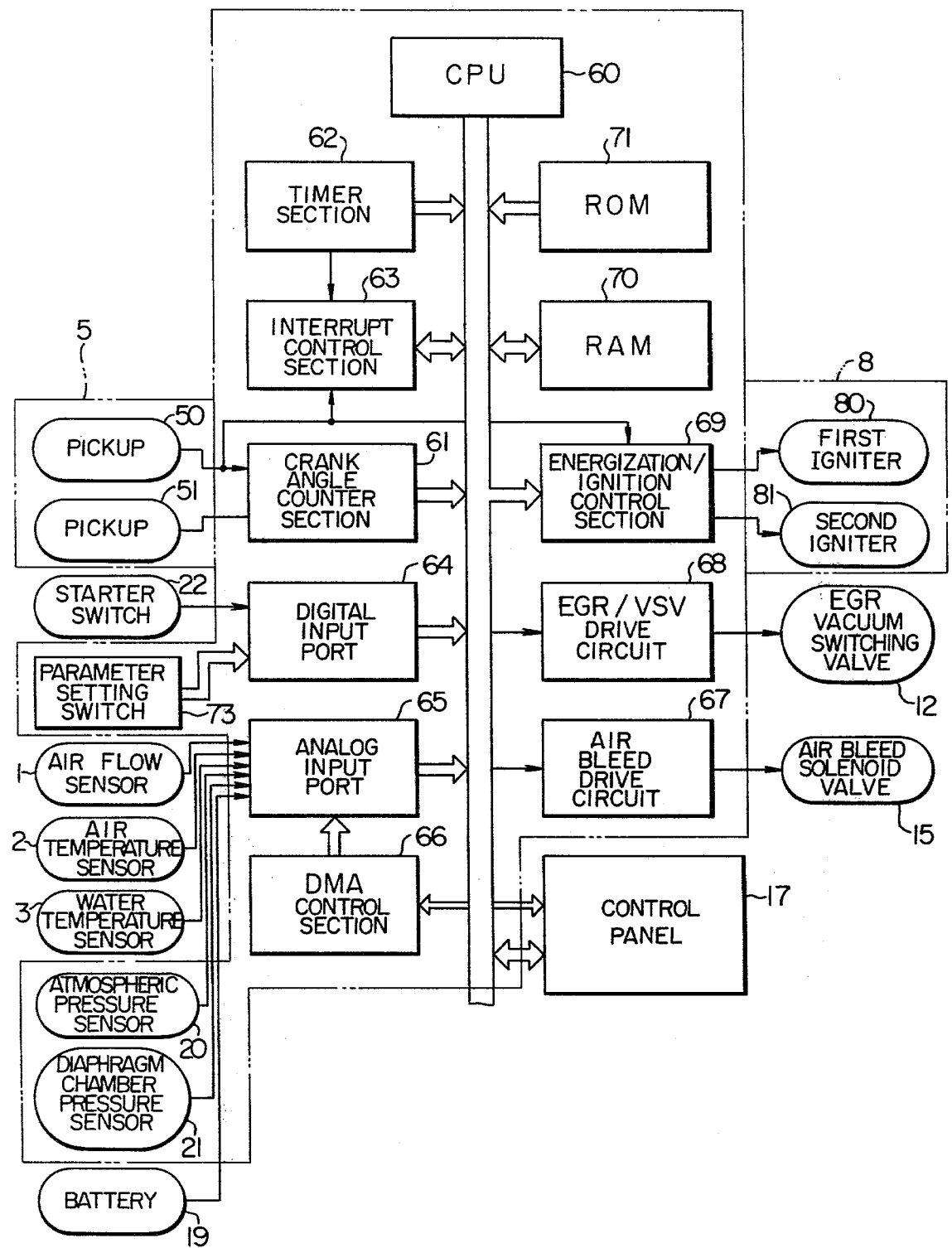
FIG. 2 is a block diagram for the microcomputer shown in FIG. 1.
Figure 3:
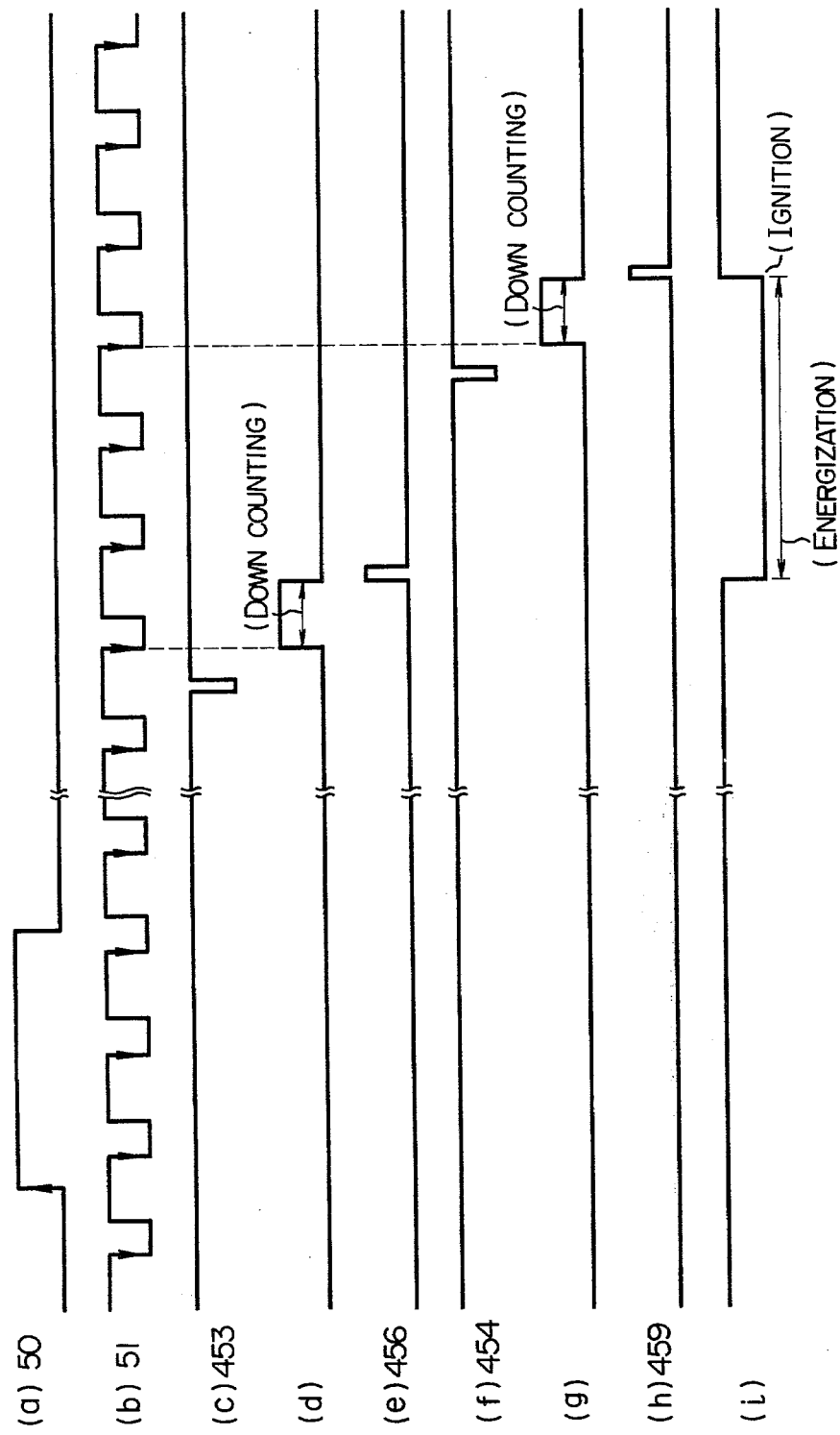
FIGS. 3 and 8 are waveform diagrams useful for explaining the operation of the individual component parts shown in FIG. 2.

FIG. 2 shows a block diagram which is useful for explaining the computer 6 in greater detail. In the Figure, numeral 60 designates a central processing unit (CPU) of the TI 9900 series for computing the ignition timing, EGR rate (diaphragm chamber pressure), etc. Numeral 71 designates a read-only memory unit (ROM) storing the required program, the optimum advance angle values and EGR rates corresponding to the respective engine conditions, etc., and 70 a temporarily memory unit (RAM) adapted for use when the program is in operation. The angle sensor 5 shown in FIG. 1 comprises a disk mounted on the distributor shaft adapted to rotate once for every 2 revolutions of the engine crankshaft and two electromagnetic pickups. The disk is circumferentially magnetized at equal spaces successively in the order of N→S→N and also two magnets for detecting the TDC (engine top dead center) are embedded in the disk so as to be displaced 180° from each other. Consequently, the two pickups 50 and 51 generate 24 pulses or crank angle signals and another two pulses or TDC signals for every revolution of the signal generator. The signal genertor 4 incorporates pickup output waveform reshaping circuits so that the TTL level signals such as shown in (a) and (b) of FIG. 3 are applied to the computer 6 from the crank angle signal terminal (51) and the TDC signal terminal (50). A crank angle counter section 61 is responsive to the two signals to transfer the current crankshaft position to the CPU 60. The CPU 60 computes the engine rotational speed in response to this position information and the output of a timer section 62. The analog voltage signals from the air flow sensor 1, the air temperature sensor 2, the engine cooling water temperature sensor 3, the atmospheric pressure sensor 20, the diaphragm chamber pressure sensor 21 and the battery 19 are subjected to A/D conversion by an analog input port 65 and are transferred by DMA to the RAM 70 by a DMA control section 66. Thus, in the present embodiment the CPU 60 does not directly take part in the A/D conversion and the necessary latest data can be obtained by making an access to a predetermined address of the RAM 70 when it becomes necessary to do so in the course of the computational operation. A digital input port 64 receives the signal from the starter 22 indicative of the engine starter being in operation and the signal from a parameter setting switch 73 such a fixed advance switch mounted within the computer 6. In accordance with the program stored in the ROM 71, the CPU 60 computes the ignition timing and the coil energization starting timing (energization period) in synchronism with the engine crankshaft position so that in accordance with the computation results, energization and ignition position data are applied to an energization/ignition control section 69. In response to these data and the crank angle signals the energization/ignition control section 69 applies an on-off signal to the igniter 8 as shown in (i) of FIG. 3. In this embodiment, the ignition system is of the so-called distributorless double coil type which has no need to distribute an ignition high voltage and consequently the control section 69 generates a coil-B signal which is applied to a first igniter 80 for the No. 1 and 2 cylinders of the four cylinders and a coil-A signal which is applied to a second igniter 81 for the No. 2 and 3 cylinders. In synchronism with the time and in accordance with the computed desired optimum EGR rate and the current (or the actual) EGR rate obtained from the diaphragm chamber pressure $P_D$ of the second EGR valve and the atmospheric pressure $P_A$, signals for turning on and off the vacuum switching valve or VSV 12 for EGR (or for controlling the second valve 9) and the VSV 15 for controlling the air bleed 14 are applied from the CPU 60 to an EGR-VSV drive circuit 68 and an air bleed VSV drive circuit 67. An interrupt control section 63 is provided to generate an interruption signal for accomplishing the desired crank angle synchronization and time synchronization processing. Numeral 72 designates a common bus which is used for the transmission of information between the CPU 60 and the individual circuits. With this system, when occasions demand, the control or front panel 17 can be connected to the system by means of the DMA control section 66 so as to allow the writing of data into the RAM 70 as well as the reading of data from the ROM 71 and the RAM 70. The selection of the CPU states (run and hold states) can also be controlled from the front panel 17.

Figure 4:
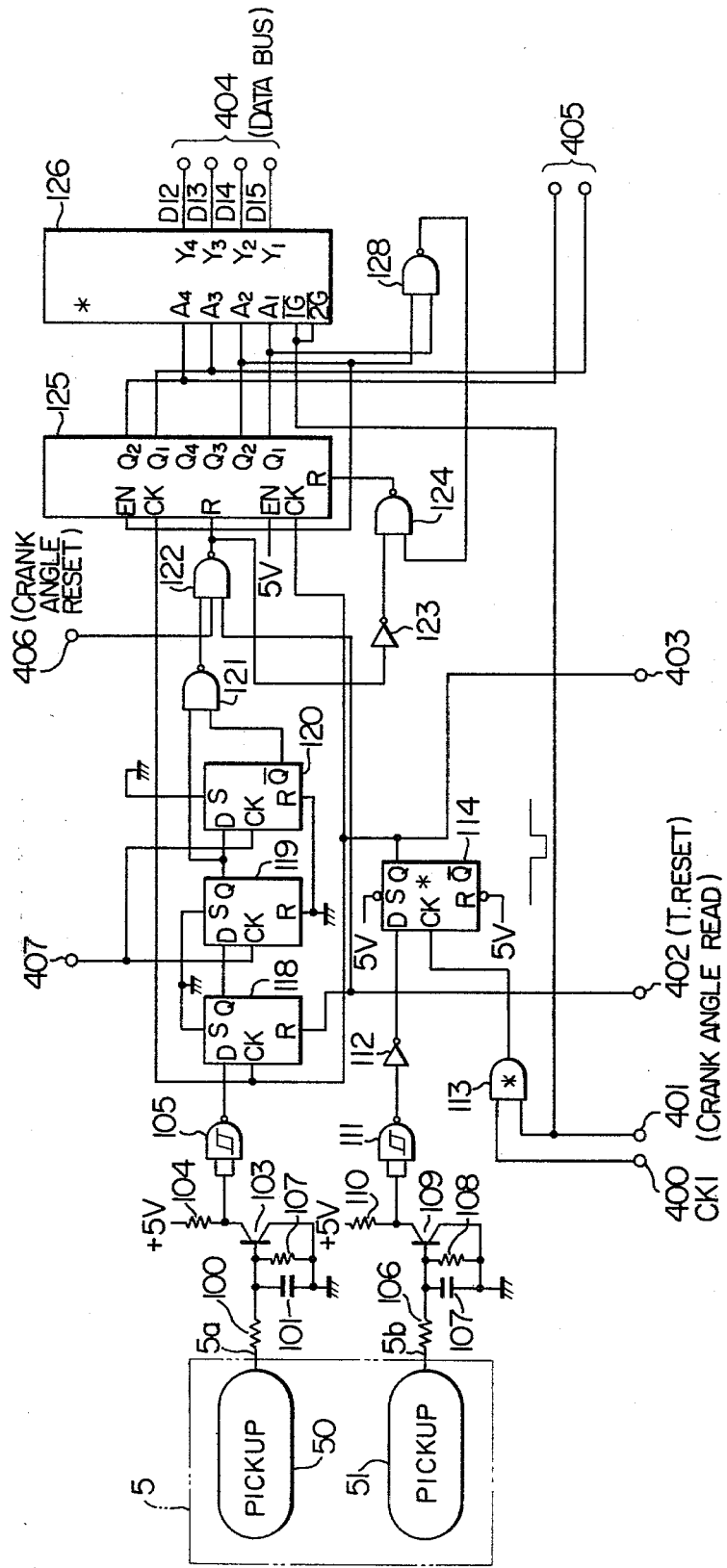
FIGS. 4 to 7 and 9 to 13 are circuit diagrams of the individual component parts shown in FIG. 2.

The above-mentioned individual circuits and sections will now be described in greater detail individually. FIG. 4 shows in detail the circuit construction of the crank angle counter section 61. The crank angle counter section 61 indicates the current position of the crankshaft which is represented by a duodecimal number in response to the signals from the pickups 50 and 51 of the angle sensor 5 mounted on the signal generator 4 which makes one revolution for every two revolutions of the engine crankshaft. The crank angle signals $5b$ shown in (b) of FIG. 5 and generated from the pickup 51 of the angle sensor 5 are reshaped by a low-pass filter 106, 107, a transistor 109 and a Schmitt input NAND device 111 and then are applied to a D-type flip-flop 114 (e.g., the TI SN74LS74). The flip-flop 114 is provided to prevent the content of a counter 125 from being changed by any up counting when the data is being transferred in response to the crank angle read command from the CPU 60, and the supply of clock pulses 400 for introducing the crank angle signals $5b$ is stopped by an AND device 113 during the crank angle read operation (when a signal terminal 401 is at a logical "0"). The Q output of the flip-flop 114 is applied to the CK (clock) terminal of the synchronous 4-bit counter 125 (e.g., the RCA CD4520B). The counter 125 comprises a ternary 2-bit counter and a quarternary 2-bit counter which are connected in series with NAND gates 128 and 124 and as a whole the counter 125 functions as a duodecimal (3×4) counter. The content of the counter 125 corresponds to the position of the crankshaft and it is counted up in response to the trailing edge of each crank angle signal $5b$. The content of the counter 125 is delivered to a data bus 404 through a buffer 126 (e.g., the TI SN74LS244) in response to the crank angle read command from the CPU 60. The TDC signal $5a$ from the pickup 50 of the angle sensor 5 is one which indicates the TDC position of the No. 1 and 4 cylinders, respectively, and a pulse is generated as shown in (a) of FIG. 3 each time the crankshaft passes the TDC of the No. 1 and 4 cylinders, respectively. In the like manner as the crank angle signals $5b$, the TDC signal $5a$ is reshaped by a resistor 100, a capacitor 101, a transistor 103 and a Schmitt input NAND device 105 and is then applied to the D (data input) terminal of a D-type flip-flop 118 (e.g., the RCA CD4013B). The crank angle signals are applied to the CK terminal of the flip-flop 118 whose Q output is connected to the D terminal of a D-type flip-flop 119. As a result, in response to the trailing edge of the first crank angle signal after the transition of the TDC signal $5a$ to a logical "1", a pulse (whose pulse width is determined by the frequency of a CK2 signal 407) is generated through the flip-flops 119 and 120 and a NAND device 121 and the pulse resets the counter 125 (the counter content is cleared to "0000"). In other words, TDC corresponds to "0000" and 90° crank angle (CA) corresponds to "0100". The counter 125 is also reset by a T.RESET signal 402 or a system initializing signal as well as the RESET command 406 from the CPU 60. In the circuit diagrams shown in FIGS. 4 to 13, those bearing a mark of * are TTL logic elements and the other logic elements consist of C-MOS logic elements. This is due to the fact that the CPU 60 operates at high speeds and consequently an interface comprising C-MOS logic elements cannot meet the requirements in terms of time.

Figure 5:
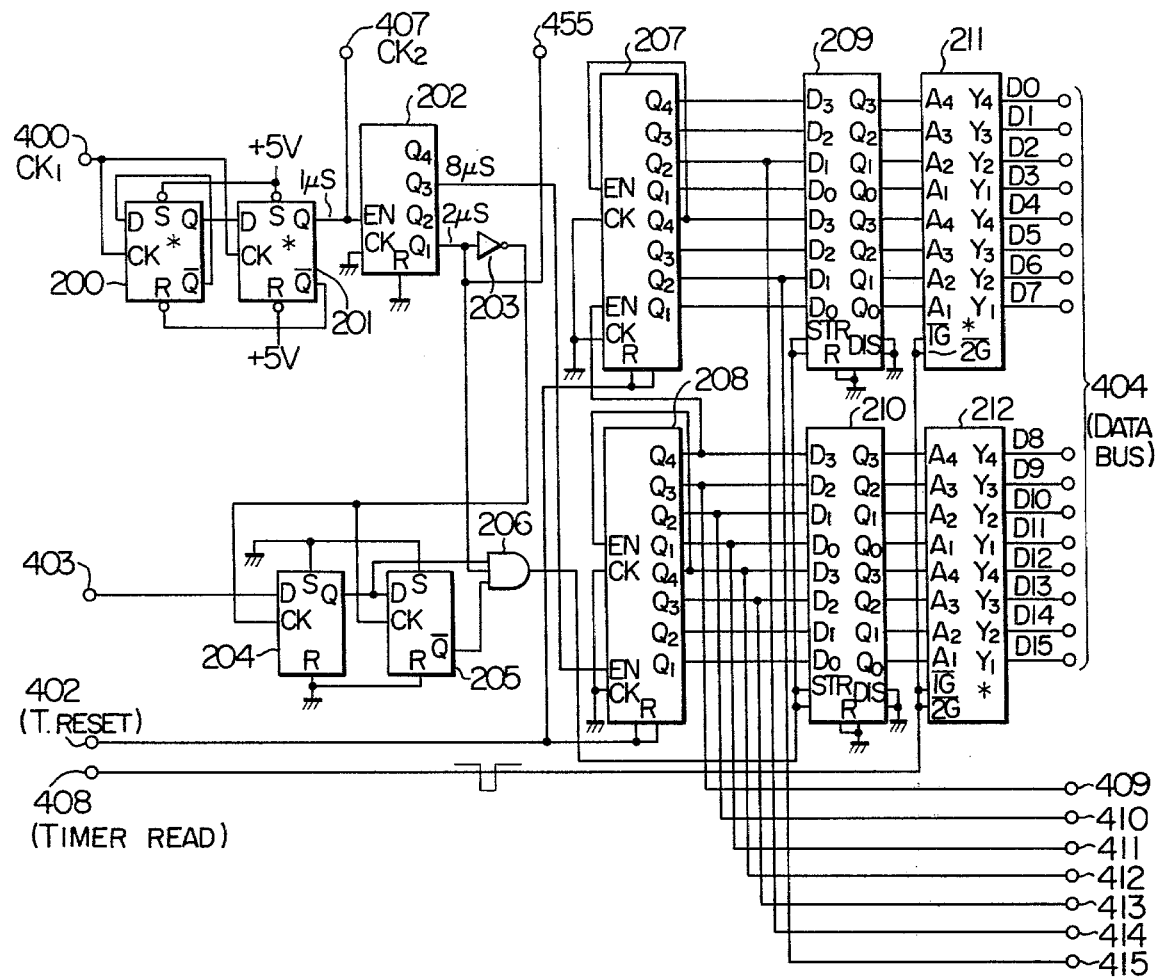

Next, the timer section 62 will be described with reference to FIG. 5. The 3 MHz frequency clocks $CK_1$ applied from the CPU 60 through the terminal 400 are subjected to 3:1 frequency division by D-type flip-flops 200 and 201. The resulting clocks (CK2) are applied to a 4-bit counter 202 so that the clocks are subjected to 8:1 frequency division and are applied as clocks to an 8-bit counter 208. An 8-bit counter 207 and the 8-bit counter 208 form a 16-bit real-time timer which counts times from 0 to 524,280 μsec. The timer is designed so that the current time is latched in 8-bit latches 209 and 210 (e.g., the RCA CD4508B) in response to the leading edge of the crank angle pulse applied from the crank angle counter section 61 through the terminal 403. In response to the timer read command applied from the CPU 60 through a terminal 408, the latched time is transferred to buffers 211 and 212 and further to the CPU 60 through the data bus 404. The purpose of flip-flops 204 and 205 is to generate a latching strobe pulse of 2 μsec width in response to the leaading edge of the signal at the terminal 403. A three-input NAND gate 206 is provided to prevent any overlapping between the up counting time and the time latching time and consequently the latch timing is delayed by 1 μsec at the maximum when the LSB output of the counter 202 is "0".

Figure 6:
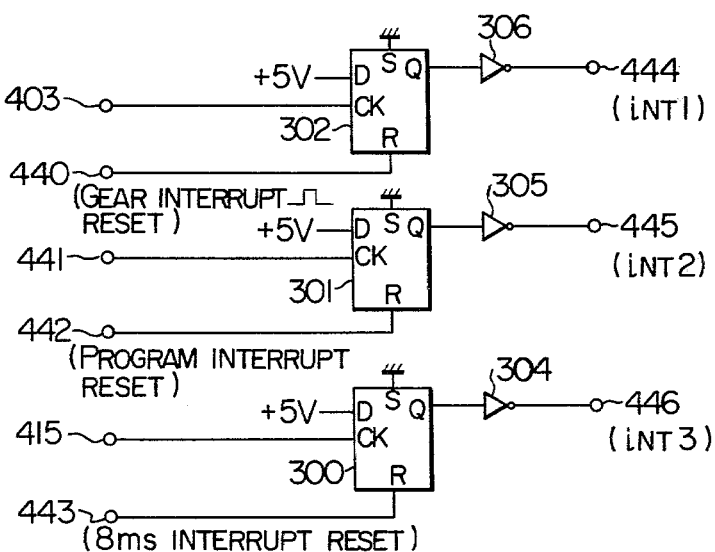

Next, the interrupt control section 63 will be described with reference to FIG. 6. Firstly, each time a crank angle signal is applied through the terminal 403, a gear interrupt flag or D-type flip-flop 302 is set to "1" and an interrupt request signal is applied to the CPU 60 through an inverter buffer 306 and a terminal 444. When this interruption is accepted, the gear interrupt flag 302 is reset by the CPU 60 through a terminal 440 in accordance with a gear interrupt processing program which will be described later. Similarly, when a program interrupt port is set to "1" during the gear interruption program, a program interrupt flag 301 (D-type flip-flop) is set through a terminal 441 and an interrupt request signal is applied to the CPU 60. This flag is also reset by a command applied from the CPU 60 through a terminal 442. Also, in response to the clock of 8.192 msec applied from the 16-bit timer (207, 208) of the timer section 62 through a terminal 415, an 8 msec-interrupt flag 300 (D-type flip-flop) is set and an interrupt request is sent to the CPU 60 by way of a terminal 446. In other words, this interruption is generated for every 8.192 msec and is used as the time base for the software. This interruption is also reset by the command from the CPU 60.

Figure 7:
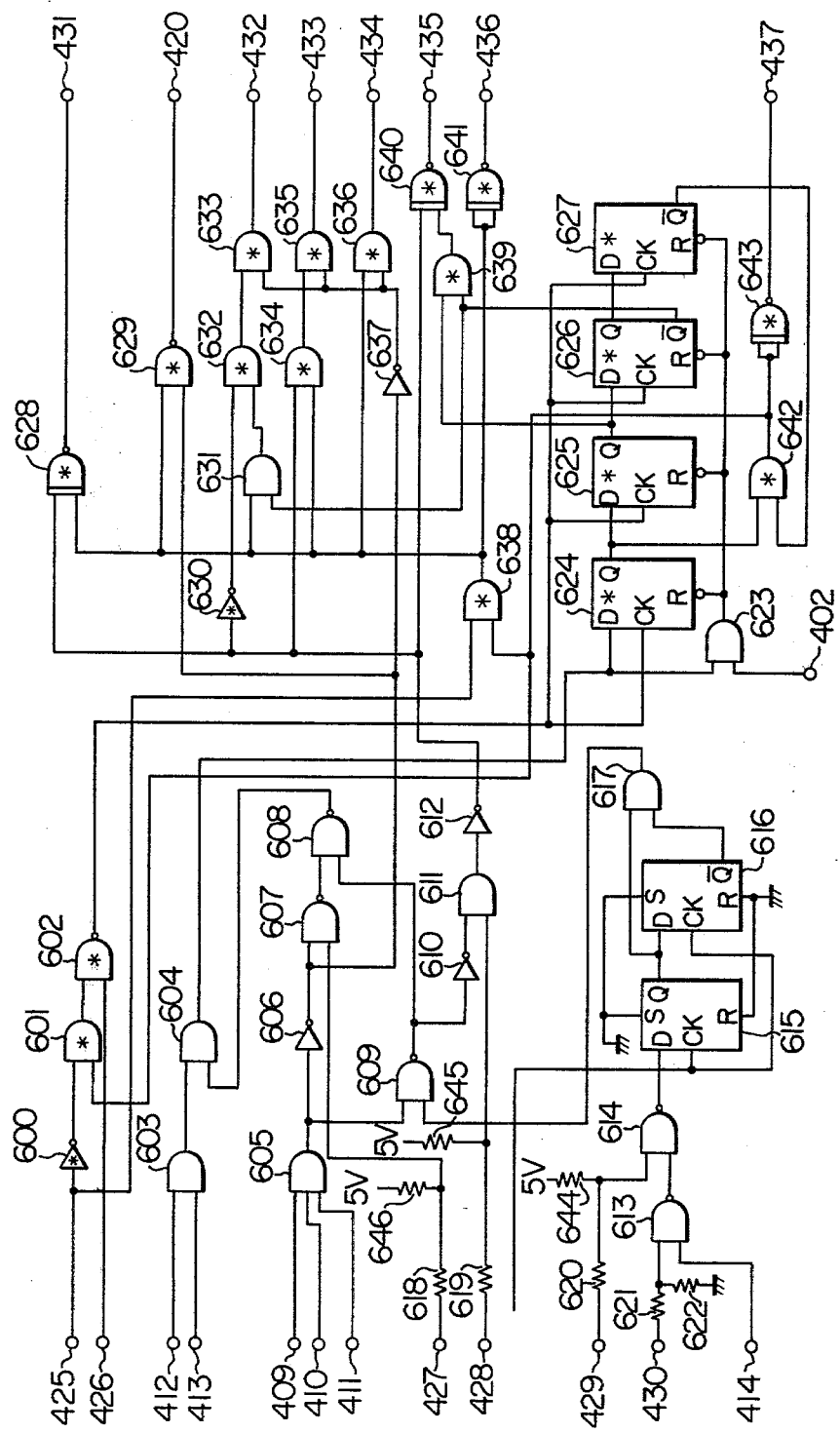
Figure 8:
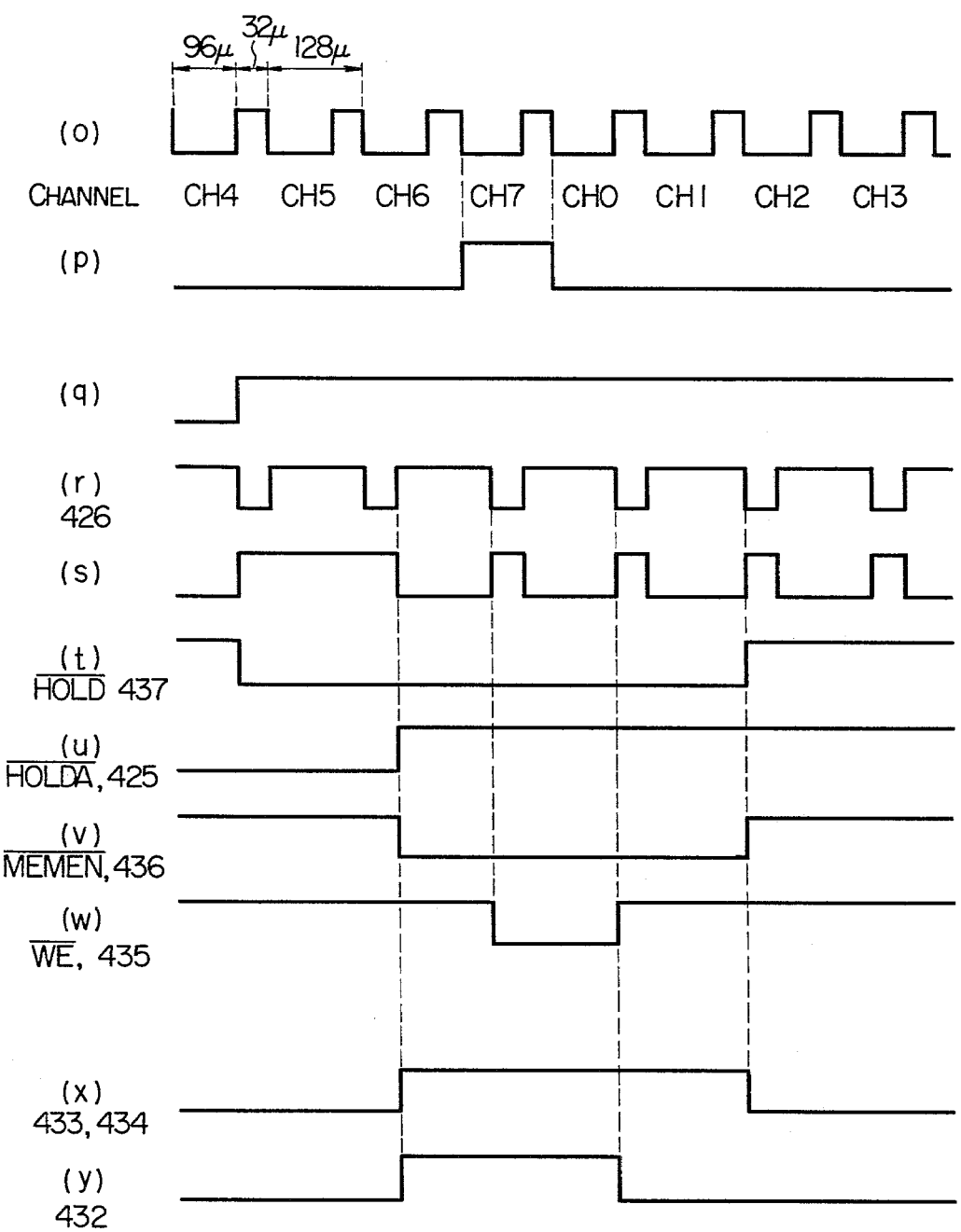
Figure 9:
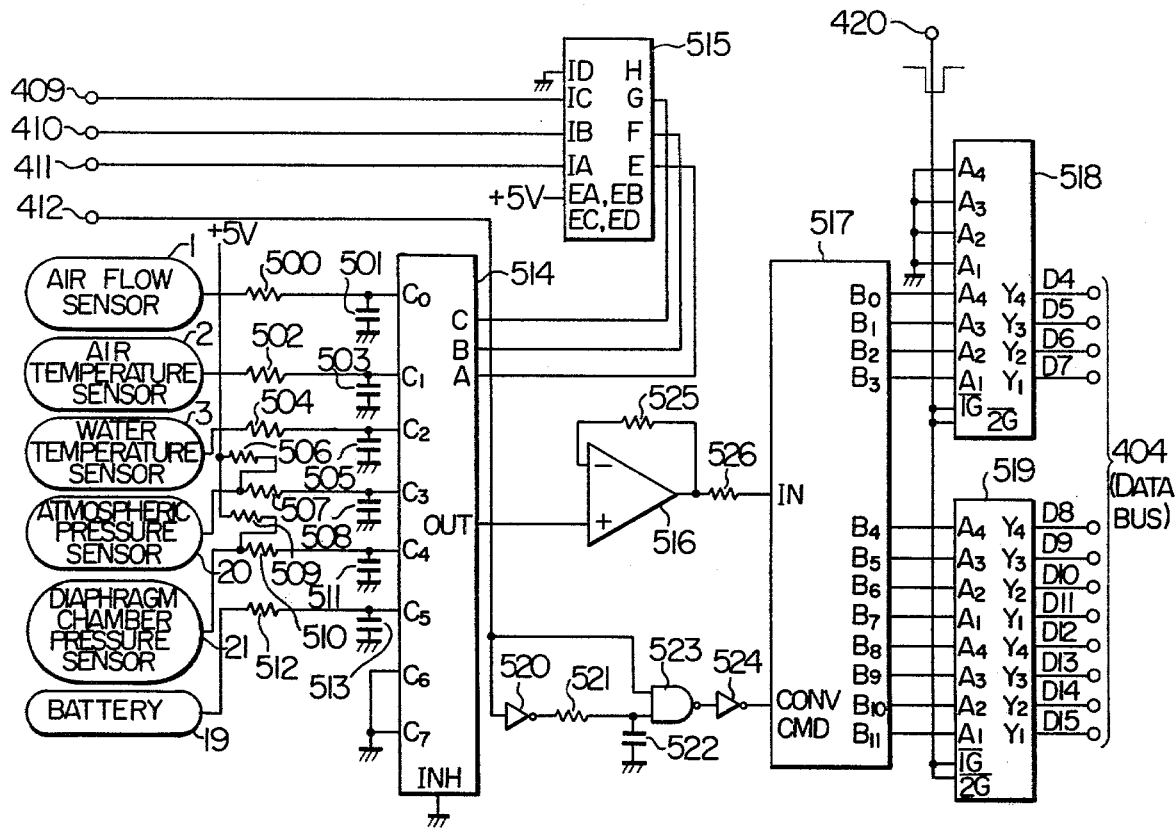
Figure 10:
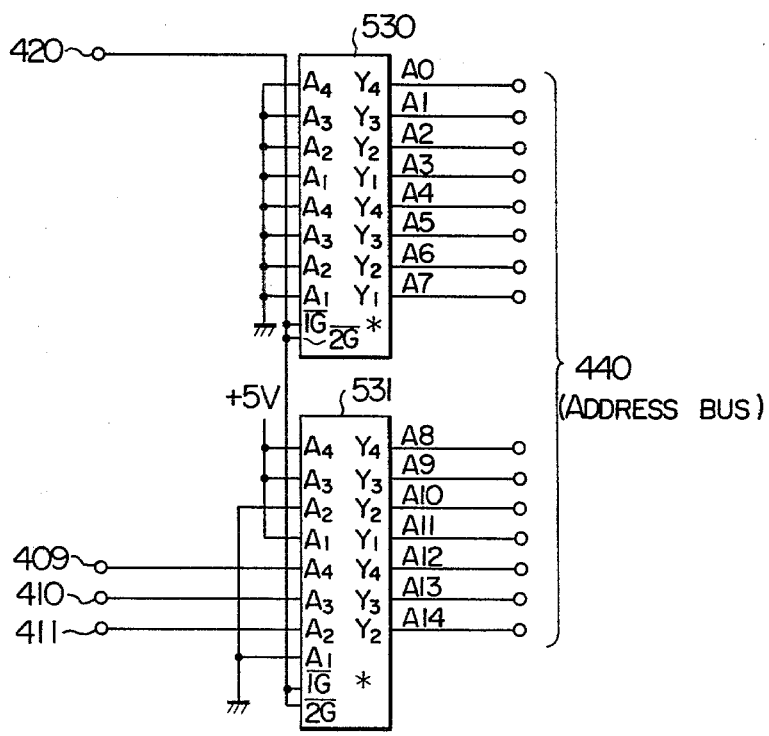

Next, the DMA control section 66 will be described with reference to FIGS. 7 and 10. Terminals 409, 410, 411, 412 and 413 are provided to generate a HOLD request signal (terminal 437) for causing the CPU 60 to temporarily stop the execution of the program and they receive the output signals of the timer section 62 shown in FIG. 5. In the timer section 62, when the bit 2 (at terminal 413) and the bit 3 (at terminal 412) of the 16-bit real-time timer (207, 208) are both at "1", the output of an AND gate 603 goes to "1". In other words, the waveform shown in (O) of FIG. 8 is generated. Similarly, the output of a 3-input AND gate 605 has a waveform as shown in (P) of FIG. 8. Designated by numerals 618 to 622 and 644 to 646 are CMOS input protective resistors. In this embodiment, the DMA control section 66 includes 8 channels and the transfer of data is effected between the RAM 70 and all the channels at intervals of about 1 msec. Of the 8 channels, the first 7 channels (the CH0 to CH6 in (O) of FIG. 8) are used for the transfer of A/D converted data and the last one channel (CH7) is used for the transfer of data between the control panel 17 and the RAM 70. In the case of A/D converted data, in (O) of FIG. 8 the A/D conversion is effected during the first 96 μsec and the data is transferred during the next 32 μsec. When the output of the AND gate 603 goes to "1", if no external HOLD request signal is being applied to the computer from the control panel 17 (or when a terminal 427 is at "1"), the output of the AND gate 605 goes to "0" (and consequently the output of 608 goes to "1") and thus the D input of a register 624 (e.g., the TI 74LS175) goes to "1". The CK input of the register 624 is supplied with the 3 MHz clocks from the CPU 60 through a terminal 426. Since the Q output of the register 624 is at "0" immediately after the transition to "1" of the D input of the register 624, the output of an AND gate 642 goes to "0" and the output of a NAND gate 601 goes to "1", thus applying the 3 MHz clocks as such to the CK input of the register 624. When a "1" is taken into the register 624 in response to the clock following the transition of its D input to "1", the Q output of the register 624 goes to "1" as shown in (q) of FIG. 8. When the Q output of the register 624 goes to "1", the output of the AND gate 642 changes to "1" so that the output of a NAND gate 643 with 3-state output (e.g., the TI 74LS38) goes to "0" and a HOLD request signal ("0") for starting DMA is applied to the CPU 60 (See (t) of FIG. 8). The CPU 60 receives this HOLD request signal from the terminal 437 after completion of the machine cycle being executed and a HOLDA signal "1" is generated at a terminal 425 as shown in (u) of FIG. 8. Since the output of the NAND gate 601 remains at "0" until the HOLDA signal (at terminal 425) goes to "1" with the terminal 437 being at "0" and the HOLD request signal being generated, No. 3 MHz clock is applied to the CK terminal of a register 625 through the terminal 426. When the HOLDA signal goes to "1", the clock is applied to the CK terminal of the register 625 so that a "1" is taken into the register 625 and its Q output goes to "1". When the next clock is applied, the Q output of a register 626 goes to "1" and the clock after next causes the Q output of a register 627 to go to "0". When the Q output of the register 627 goes to "0", the output of the NAND gate 643 presents a high impedance so that the HOLD request is released and the DMA cycle is completed. When the HOLDA signal goes to "1", the output of an AND gate 638 goes to "1" so that the output of a 3-state output NAND gate 641 goes to "0" during the time that the HOLD request signal (HOLD) is at "0" and the HOLDA signal is at "1", thus applying a memory enable selection signal (MEMEN, 436) to the RAM 70 as shown in (v) of FIG. 8. Also, since the output of an AND gate 639 goes to "1" only during the time that the Q output of the register 625 is "1" and the $\overline{Q}$ output of the register 626 is at "1" and since the output of the 3-input AND gate 605 is at "0" so long as the channels CH0 to CH6 are being selected, the output of an inverter 612 goes to "1" and a WRITE signal ($\overline{WE}$, 435) to the memory or RAM 70 is applied to a 3-state output NAND gate 640 as shown in (w) of FIG. 8. On the other hand, during the time that the memory enable selection signal $\overline{MEMEN}$ remains at "0", the output of a NAND gate 628 or the READ signal (DBin, 431) to the memory is held at "0". So long as the HOLDA signal is at "1" (during the DMA cycle), the CPU 60 is out of operation and the driving from the CPU side of the control lines, address bus and data bus for the $\overline{MEMEN}$, DBin, $\overline{WE}$, etc., are in the "high impedance" state. As a result, during the time interval the data are directly transferred to the RAM 70 from the DMA control section 66. In the case of the A/D converted data transfer for the channels CH0 to CH6, the output of an inverter 606 is at "1" so that a signal similar to the signal $\overline{MEMEN}$ in (v) of FIG. 8 is delivered to a terminal 420 or the output of a NAND gate 629 and the signal is applied to the strobe inputs of an A/D converted data register (518, 519) of FIG. 9 and an A/D conversion address register (530, 531) of FIG. 10, respectively. In other words, during the time that the signal $\overline{MEMEN}$ is at "0", the A/D converted data are delivered onto the data bus (404) and also the addresses corresponding to the channels CH0 to CH6 are delivered onto an address bus (440). The data generated on these buses are written into the RAM 70 in response to the WRITE signal $\overline{WE}$. When there is an external HOLD request signal from the control panel 17 or when the terminal 427 is at "1", the A/D conversion DMA cycle for the channels CH0 to CH6 is not performed. In other words, even if the output of the NAND gate 607 goes to "0" and the output of the AND gate 603 goes to "1", the output of the register 624 remains in the "0" state and consequently the DMA cycle is not initiated. Next, the DMA cycle of the channel CH7 for the transfer of data between the control panel 17 and the RAM 70 will be described. A terminal 428 receives a R/$\overline{W}$ signal from the control panel 17, a terminal 429 a data transfer request signal, a terminal 430 a continuous READ signal and a terminal 414 the clock signal of about 128 msec supplied from the timer section 62. Firstly, when a data write request is made for the RAM 70 from the control panel 17, the terminals 428, 429 and 430 all go to "0". The outputs of the AND gates 605 and 603 both go to "1" as shown in (o) and (p) of FIG. 8 and the DMA cycle is started for the channel CH7. In response to the transition of the terminal 429 from "1" to "0", registers 615 and 616 generate a positive polarity pulse of 1.0 msec width at the output of an AND gate 617. This pulse is converted to a negative polarity pulse of 128 μsec by a NAND gate 609 and the pulse is then applied as a positive polarity pulse of 32 μsec to the D input of the register 624 through the NAND gate 608 and the AND gate 604. When the WRITE request is made to the RAM 70 from the control panel 17, the $\overline{\text{HOLD}}$, HOLDA, $\overline{\text{MEMEN}}$, $\overline{\text{WE}}$ and DBin control lines are driven in all the same manner as in the case of the previously mentioned DMA data transfer for the A/D converted data as will be seen from (t) to (w) of FIG. 8. In addition, during the time that the signal $\overline{\text{MEMEN}}$ is at "0", a positive polarity pulse is generated as shown in (x) of FIG. 8 at each of terminals 434 and 433 for delivering onto the address bus and the data bus the contents of the registers storing the addreses and data which are to be transferred to the RAM 70. When a data read-in request is made to the RAM 70 and the ROM 71 from the control panel 17, the terminals 429 and 430 go to "0" and the terminal 428 goes to "1". In the DMA cycle for this case, of the computer control lines, while the signal $\overline{\text{WE}}$ (at terminal 435) remains at "1" even during the time that the memory enable selection signal $\overline{\text{MEMEN}}$ (at terminal 436) is at "0", the output of an AND gate 611 is at "1" and consequently the DBin signal (at terminal 431) is at "1". The other control lines for $\overline{\text{HOLD}}$, HOLDA and $\overline{\text{MEMEN}}$ are the same as in the case of the previously mentioned A/D converted data transfer cycle and the data write cycle from the front panel 17. When the continuous READ signal (at terminal 430) is at "1", the 128 msec clocks are generated at the output of a NAND gate 613. The clocks are equivalent to the data read-in requests made to the RAM 70 and the ROM 71 from the front panel 17 at intervals of 128 msec and consequently the DMA data transfer cycle from the RAM 70 and the ROM 71 to the front panel 17 is made once for every 128 msec as mentioned previously. In this case, the DMA cycle from the front panel 17 is performed even if there is the external HOLD request signal (at terminal 427).

Next, the analog input port 65 will be described with reference to FIG. 9. Those filters (500 to 513) each comprising a resistor and a capacitor and connected just to the rear of the respective sensor input terminals (1 to 3 and 19 to 21), are provided to remove the noise components superposed on the signal lines. The six sensor input terminals are connected to the respective inputs of an 8-channel multiplexer 514 (e.g., the CD4051B) and one of these inputs is selected according to the levels of address inputs A, B and C. In other words, when the inputs A, B and C are respectively at "0", "0" and "0", the input C0 is selected and the input C1 is selected when these inputs are respectively at "1", "0" and "0". The address inputs A, B and C of the multiplexer 514 are connected to the real-time timer (207, 208) of the timer section 62 by way of a level converter 515 (e.g., the CD 40109B). As a result, the channel to be selected is switched for every 128 μsec in such a way as C0→C1→C2→ - - - →C0 and thus each of the channels is selected once for every 1 msec. The terminal 412 is also connected to the real-time timer (207, 208) to generate a clock of 64 μsec. In other words, at the instant that the addresses of the multiplexer 514 are switched the terminal 412 goes from "0" to "1". When this occurs, A/D start pulses of several μsec are generated by inverters 520 and 524, a NAND gate 523, a resistor 521 and a capacitor 522 and the pulses are then successively applied to the CONV·CMD terminal of a comparator type A/D converter 517 (e.g., the Bur Brown ADC-80AG), thus initiating the A/D conversion. One of the inputs selected in accordance with the values of the address inputs A, B and C is generated as such at the output of the multiplexer 514 so that the output is subjected to current amplification by an operational amplifier 516 (e.g., the NEC μPC151A) and then it is applied to the analog input terminal of the A/D converter 517. After the application of the conversion start signal to the CONV·CND terminal of the A/D converter 517, the analog input is converted to a 12-bit digital data in about 40 μsec and generated at its outputs B0 to B11. At the expiration of 96 μsec after the application of the conversion start signal, the DMA data transfer cycle is initiated and the converted digital data or the 12-bit data at the outputs B0 to B11 is written through buffers 518 and 519 into the address of the RAM 70 corresponding to the selected channel.

Figure 11:
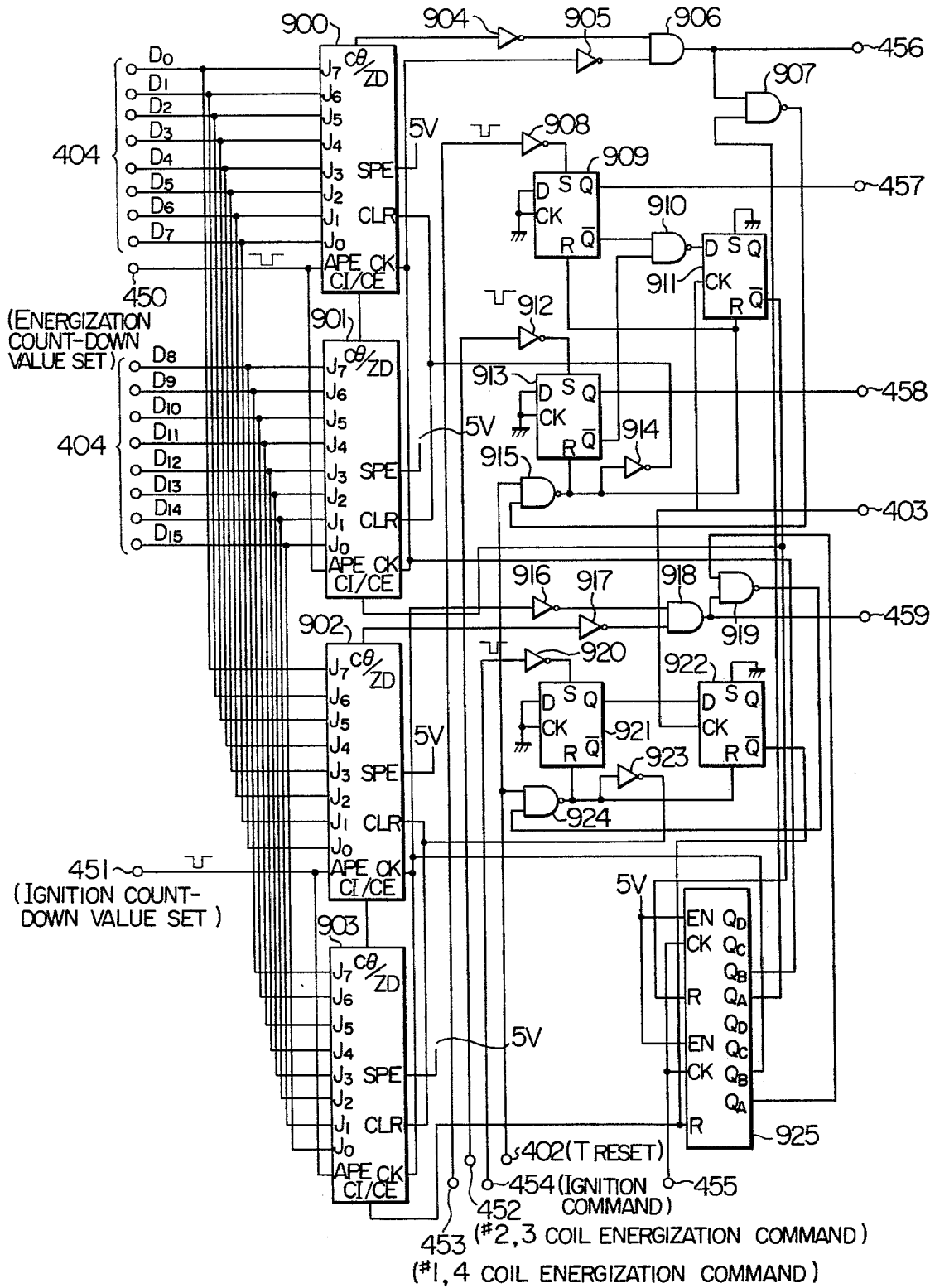
Figure 12:
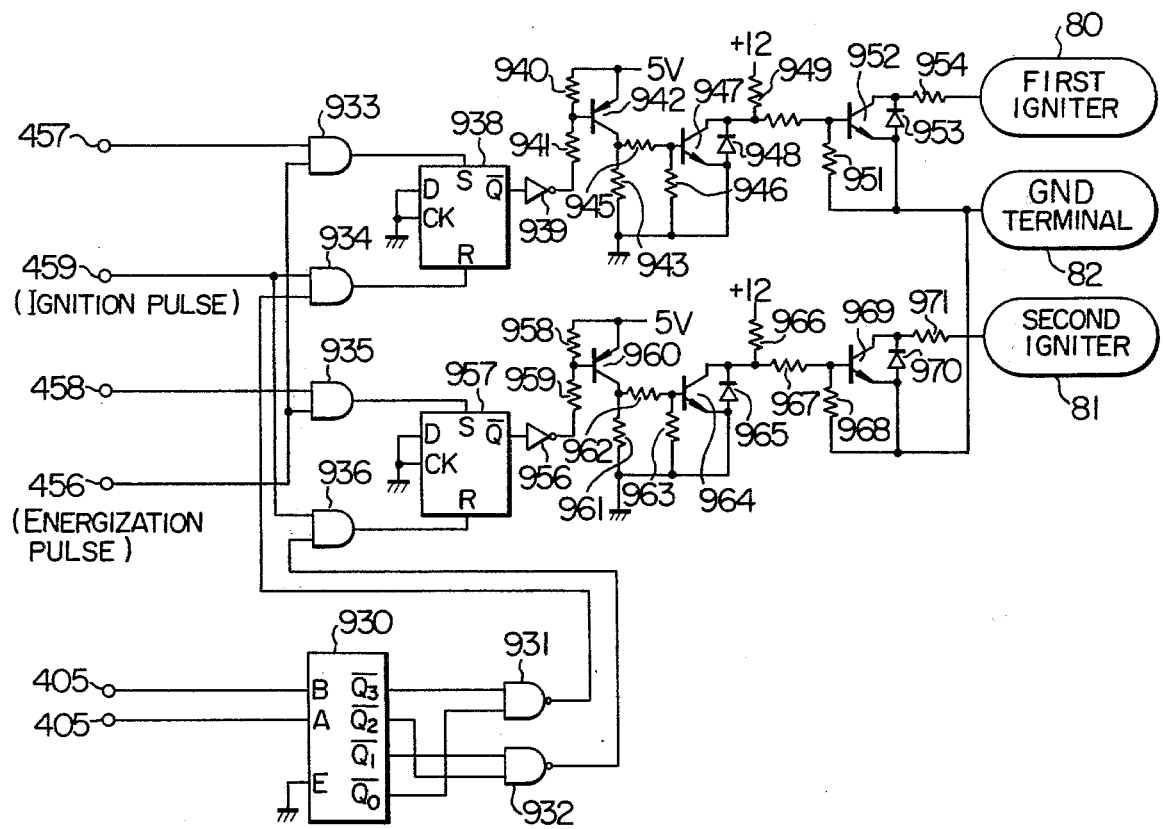

Next, the energization/ignition control section 69 will be described in detail with reference to FIGS. 11, 12 and 3. In accordance with the information from the crank angle counter section 61 and the interruption (the gear interruption) caused in response to the application of each crank angle signal, the CPU 60 determines the current position of the crankshaft with the accuracy of $360 \div 12 = 30$ (°CA). The manner of realizing the optimum energization timing and ignition timing computed in accordance with the program will now be described in connection with the No. 1 and 4 cylinders. The same description applies to the No. 2 and 3 cylinders. As regards the energization, the optimum energization angle $\theta$ will be analyzed as shown by the following equations.

$$\theta = \theta_1 + \theta_2$$

$$\tau = \tau(\theta_2 \cdot N) \qquad (1)$$

$\theta$ = energization angle
$\theta_1$ = energization starting crank angle ($0 \sim 11 \times 30°$ CA) determined by CPU in units of 30° CA or the angle corresponding to each gear position of rotational angle sensor 5
$\theta_2$ = fraction which is less than 30° CA
$\tau$ = fraction $\theta_2$ of less than 30° CA which is expressed in terms of a time in units of 8 μsec according to the current speed N.

When the gear interrupt occurs at the gear position ($\theta_1 - 1$) just preceding the gear position $\theta_1$ computed from the above equations, the CPU 60 generates a No. 1, 4-coil energization command (at terminal 453) as shown in (c) of FIG. 3 and an energization count-down value setting command (at terminal 450). In response to the pulse applied to the terminal 450, the data of $\tau$ simultaneously delivered to the data bus 404 from the CPU 60 is set in a 16-bit energization down counter formed by down counters 900 and 901. Each of the down counters 900 and 901 comprises an 8-bit down counter (e.g., the RCA CD40103B) and they are connected in series to form a 16-bit down counter. This 16-bit count-down value may assume any one of values from 0 to 0.52428 sec with the accuracy of 8 μsec. As a result, the down counting can be linearly accomplished for such a small number of revolutions as 3 rpm without any overflow. When a flip-flop 909 is set, its $\overline{Q}$ output goes to "0" and consequently the output of a NAND gate 910 or the D input of a D-type flip-flop 911 goes to "1". Since the CK or clock input of the flip-flop 911 is connected to the terminal 403 for crank angle signals, the flip-flop 911 is set by the crank angle pulses following the generation of the No. 1, 4-coil energization command and the energization count-down value setting command. Shown in (d) of FIG. 3 is the signal waveform for the Q output of the flip-flop 911. When the flip-flop 911 is set, the $\overline{Q}$ output goes to "0" allowing the down counters 900 and 901 to count down and also the reset input of a 4-bit frequency divider 925 is released thus supplying the count-down clocks to the CK input of the down counters 900 and 901 and thereby starting the down counting. The frequency divider 925 (e.g., the RCA CD4520B) receives the 2 μsec clocks from the 4-bit down counter 202 of the timer section 62 through a terminal 455 so as to divide the clocks by a factor of 4 and generate count-down clocks of 8 μsec. The desired 8 μsec clocks are not directly supplied from the real-time timer (207, 208) with a view to ensuring the desired accuracy, particularly when $\tau=0.1$. When the down counting is completed by the 16-bit down counter (900, 901), an end signal "0" is generated from the C$\theta$/ZD terminal of the down counter 900 so that the flip-flops 911 and 913 are reset as shown in (d) of FIG. 3 through an inverter 904, an AND gate 906 and NAND gates 907 and 915 and the down counters 900 and 901 are reset through an inverter 914, thus causing the C$\theta$/ZD terminal to go back to "1". Consequently, a negative polarity pulse is generated at the output of the AND gate 906 or a terminal 456 as shown in (e) of FIG. 3. On the other hand, the $\overline{Q}$ output of the flip-flop 911 goes to "1" so that the down counters 900 and 901 stop counting and the supply of the count-down clocks is stopped. In this connection, since the count-down clocks are inverted by an inverter 905 and applied to the other input of the AND gate 906, the output of the AND gate 906 goes to "1" at the expiration of 4 μsec after the generation of the count-down end signal. By so doing, it is possible to prevent the occurrence of any malfunction due to a negative polarity pulse (about 200 nsec) which may possibly be generated at the C$\theta$/ZD terminal of the down counter 900 immediately after the application of the count-down clock. The output pulse of the AND gate 906 is applied through the terminal 456 to AND gates 933 and 935 shown in FIG. 12. Now, since the Q output of a flip-flop 909 of FIG. 11 remains at "1" until the R (reset) terminal goes to "1" and since the input of the AND gate 933 is connected to the Q output of the flip-flop 909 through a terminal 457, the pulse applied to the terminal 456 is generated as such at the output of the AND gate 933 and a control flip-flop 938 for the No. 1,4-coil (the coil B) is set. When the output of the flip-flop 938 goes to "1", the output of an inverter buffer 939 goes to "0" so that transistors 942 and 947 are turned off and a transistor 952 is turned on. When this occurs, a current flows between the input terminal of the first igniter 80 and a GND terminal 82 and the energization of the coil for the No. 1 and 4 cylinders is started. Diodes 948 and 953 are provided for transistor protecting purposes and resistors 940, 941, 943 to 946, 949 to 951 and 954 are solid resistors for ignition noise attenuating purposes. One input of a NAND gate 907 is connected to the terminal of the frequency divider 925 for generating a clock of 2 μsec. As a result, even if the output of the AND gate 906 goes to "1", the resetting of the down counters 900 and 901 and the flip-flops 909 and 911 is in fact delayed by 2 μsec. This is for the purpose of ensuring the desired pulse width for the set pulse of the flip-flop 938. The ignition angle (timing) $\theta_{BX}$ is also analyzed in the similar manner as the equations (1), as follows.

$$\theta_{BX} = \theta_{BX1} = \theta_{BX2}$$

$$\tau_x = \tau_x(\theta_{BX2} \cdot N) \qquad (2)$$

$\theta_{BX}$ = ignition angle of No. 1,4-coil (coil B)
$\theta_{BX1}$ = ignition crank angle (0 to $11\times30°$ CA) which can be determined by CPU in units of 30° CA
$\theta_{BX2}$: fraction of less than 30° CA
$\tau_x$: fraction $\theta_{BX2}$ of less than 30° CA which is expressed in terms of time in units of 8 μsec according to the current speed N.

In response to the gear interruption caused by the positive-going transition of a crank angle signal 5b generated from the angle sensor 5 (the sensor 51) when the engine crankshaft arrives at a gear position ($\theta_{BX}-1$) which is just preceding the gear position ($\theta_{BX1}$) computed from the equations (2), the CPU 60 generates an ignition command at a terminal 454 as shown in (f) of FIG. 3 and the value of $\tau_x$ is set in the 16-bit down counter (902, 903). When the crankshaft arrives at the position $\theta_{BX1}$, a flip-flop 922 is set. The 16-bit down counter (902, 903) starts counting down in response to the 8 μsec clocks and upon completion of the down counting a positive polarity pulse is generated at a terminal 459 as shown in (h) of FIG. 3. Shown in (g) of FIG. 3 is the waveform for the Q output of flip-flop 922 and the Q output goes to "1" only during the down counting. In FIG. 12, a decoder 930 (e.g., the RCA CD4556B) has its A and B inputs connected respectively through terminals 405 to the two higher significant bits (bits 2 and 3) of the counter 125 in the crank angle counter section 61 of FIG. 4. As a result, when the crank angle is in the range of 0° to 90° CA or 270° to 360° CA, the output of a NAND gate 931 goes to "1", whereas when the crank angle is in the range of 90° to 270° CA, the output of a NAND gate 932 goes to "1". The proper ignition crank angle for the No. 1 and 4 cylinders is usually in the range 290° to 360° CA and the ignition crank angle for the No. 2 and 3 cylinders is in the range 110° to 180° CA. Consequently, if the crank angle is known as mentioned above, it is possible to specify one or the other of the coils with which the ignition command is associated even in the absence of any discrimination signal from the CPU 60. Now in this case, the output of the NAND gate 931 goes to "1" so that the pulse applied from the terminal 459 is generated at the output of an AND gate 934 and the flip-flop 938 is reset, causing its $\overline{Q}$ output to go to "1" as shown in (i) of FIG. 3. As a result, the transistors 942 and 947 are turned on and the transistor 952 is turned off, with the result that the current flowing between the input terminal of the first igniter 80 and the GND terminal 82 is interrupted and a high voltage is produced at the spark plug in one of the No. 1 and 4 cylinders which is on the compression stroke, thus effecting the ignition. The coil-B igniter signal for the No. 1 and 4 cylinders has been explained and the coil-A igniter signal for the No. 2 and 3 cylinders will be controlled in all the same manner.

Figure 13:
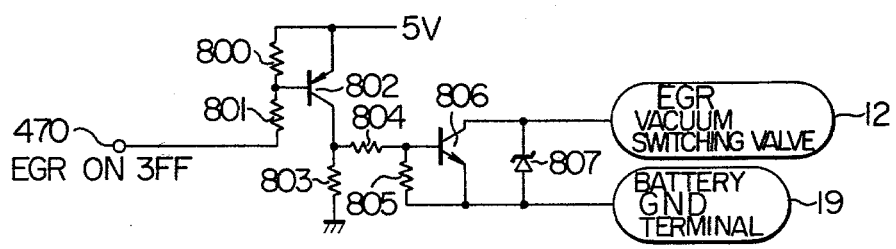

Next, the EGR-VSV drive circuit 68 will be described in detail with reference to FIG. 13. When the CPU 60 determines, in accordance with its stored program which will be described later, that the EGR controlling VSV 12 is to be turned on, a "0" signal is generated at a terminal 470. When this occurs, transistors 802 and 806 are turned on and a coil energization current flows between the terminal of the EGR-VSV 12 and a battery GND terminal 19 to turn on the EGR controlling VSV 12. On the contrary, when the CPU 60 generates a "1" signal at the terminal 470, the transistors 802 and 806 are turned off so that no current flows between the terminal of the EGR-VSV 12 and the battery GND terminal 19 and the EGR controlling VSV 12 is turned off. The air bleed VSV drive circuit 67 is identical in construction with the circuit of FIG. 13 and the air bleed controlling VSV 15 is turned on and off in response to the "0" and "1" outputs of the CPU 60.

The hardware of the exemplary system embodying the invention has been described so far and the controlling algorithm or the software will now be described.

Figure 17:
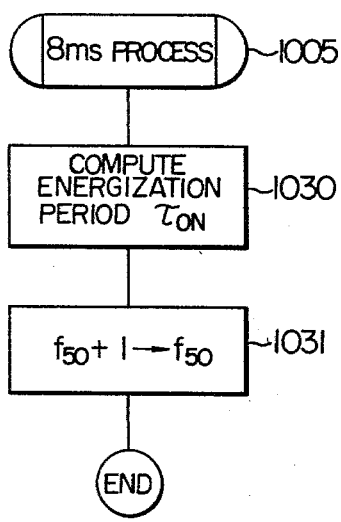
Figure 18:
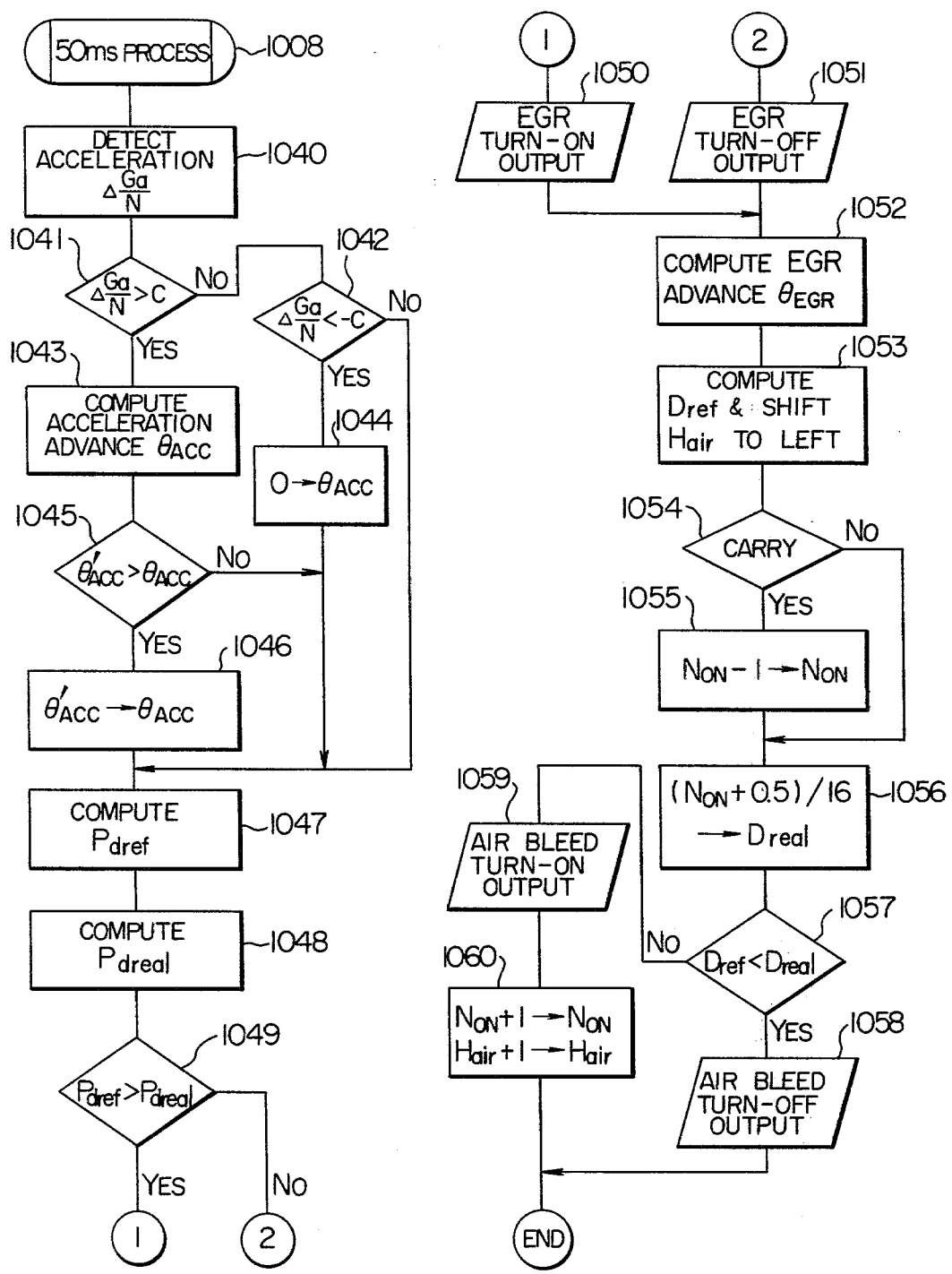
Figure 29:
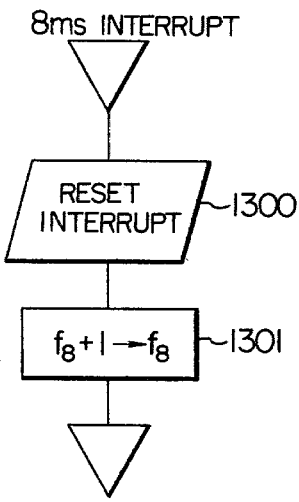

The system of this embodiment involves three kinds of interrupts each having a priority. FIG. 14 shows the interrupts. These three interrupts are, in order of priority level, a gear interrupt, a program interrupt and an 8 msec interrupt. The main routine is executed when none of the interrupts is being dealt with. The air flow rate Ga, the water temperature $T_W$, the intake air temperature $T_a$, the diaphragm chamber pressure $P_D$, the atmospheric air pressure $P_A$ and the battery voltage $V_B$ are subjected to A/D conversion and then the CPU 60 is stopped several μsec once for every 1 msec with respect to each of them. During the time interval, the data is directly transferred into the predetermined memory address in the RAM 70 by the DMA control section 66. Thus, the program is associated in no way with the A/D conversion and it is only necessary to access the corresponding address when any of these data is needed. The program will now be described in regular order. FIG. 15 shows the flow chart of the main routine which will be executed in the absence of any interrupt. The main routine is initiated in response to the connection of the power source of the computer 6 or the depression of the reset switch of the front panel 17, and at a step 1001 the computer is initialized, that is, the initialization of the program (i.e., to clear the RAM, to set the parameters to predetermined values, to allow the interrupts and so on) is performed. At the next step 1002, a base process which is illustrated in detail in FIG. 16 is performed. The base process includes the operations of computing the cooling water temperature $T_W$ and the intake air temperature $T_a$ by linear interpolation from a one-dimensional map in accordance with the A/D converted data (steps 1020 and 1023) and computing the desired water temperature advance $\theta_{TW}$ and the desired EGR water temperature correction factor $K_{TW}$ by linear interpolation from the one-dimensional map in accordance with the cooling water temperature $T_W$ at steps 1021 and 1022. At a step 1026, the desired acceleration advance factor $\gamma A_{CC}$ is computed from the following equation (3)

$$\gamma A_{CC} = C_{ACC} \times (80 - T_W) \quad (3)$$

where $C_{ACC}$ is a constant. At a step 1024, similarly the desired EGR intake air temperature correction factor $K_{TA}$ is computed by linear interpolation from the one-dimensional map in accordance with the intake air temperature $T_A$, and at a step 2025 the desired EGR atmospheric pressure correction factor $K_P$ is computed by linear interpolation from the one-dimensional map in accordance with the A/D converted data of atmospheric air pressure $P_A$. After the base process has been performed, the main routine proceeds to the next condition decision step 1003. At the step 1003, whether a flag $f_8$ is 0 or not is examined so that if the flag is 0, the main routine is returned to the base process step 1002 and if the flag is not 0 the main routine proceeds to the next step 1004. The flag $f_8$ is increased by 1 in response to every occurrence of the 8 msec interrupt shown in FIG. 29 and it is also decreased by 1 each time the following 8 msec processing step 1005 is executed by the main routine. As a result, the 8 msec process step 1005 is usually performed once for every 8 msec. The 8 msec process is illustrated in detail in FIG. 17. At a step 1030, the desired energization period $\tau_{ON}$ is computed by linear interpolation from the one-dimensional map in accordance with the A/D converted battery voltage $V_B$. At a step 1031, a flag $f_{50}$ is increased by 1 each time. After the completion of the 8 msec process step 1005, the main routine proceeds to the next decision step 1006. At this step 1006, if the flag $f_{50}$ is 6 or greater, the main routine proceeds to the next step 1007 and the flag $f_{50}$ is decreased by 6. Then, the next 50 msec process step 1008 is performed. On the contrary, if the flag $f_{50}$ is less than 5, the main routine is returned to the step 1003. FIG. 18 illustrates this 50 msec process step 1008 which is usually performed once for every 50 msec (precisely $6 \times 8.192 = 49.152$ msec). Steps 1040 to 1046 indicate the computation of acceleration advance angle. The detection of acceleration is effected as shown by the following equation $$\Delta \frac{Ga}{N} = \left(\frac{Ga}{N}\right)_0 - \left(\frac{Ga}{N}\right) 500 \quad (4)$$

where Ga is the air flow rate and N is the engine speed. In other words, the difference between the current $(Ga/N)_0$ and the data $(Ga/N)500$ obtained 500 msec before is computed at the step 1040 and whether the difference is greater than a certain value C is examined at the step 1041 to thereby determine the occurrence of an acceleration. When the acceleration is detected, a new acceleration advance angle $\theta_{ACC}'$ is computed at the step 1043 from the following equation (5)

$$\theta_{ACC}' = \gamma A_{CC} \times \Delta \frac{Ga}{N} \quad (5)$$

where $\gamma A_{CC}$ is the same as in the equation (3). After the detection of the acceleration, the acceleration advance angle $\theta_{ACC}$ is decreased by a fixed angle (0.1° to 1.0° CA) for every revolution. As a result, at the step 1045, greater one of the current acceleration advance value $\theta_{ACC}$ and the acceleration advance value $\theta_{ACC}'$ newly computed as the result of the acceleration detection is selected as a new $\theta_{ACC}$. On the contrary, when a deceleration is detected at the step 1042, the acceleration advance angle $\theta_{ACC}$ is immediately reduced to zero. Steps 1047 to 1051 are EGR process steps. In accordance with the EGR control method used with this embodiment, as mentioned previously, the pressure in the diaphragm chamber 91 of the second EGR valve 9 is set to a negative pressure corresponding to the optimum EGR rate determined by the number of revolutions N and the air flow rate Ga/N per revolution to thereby control the lift of the valve 92 and ensure the optimum EGR rate. At the step 1047, the negative pressure $P_{dref}$ corresponding to the optimum EGR rate is computed from the following equation (6)

$$P_{d\ ref} = A + K_{TW} \times K_{Tn} \times K_P \times (P_{d\ map} - A) \quad (6)$$

where
- $P_{d\ map}$ = value (negative pressure) computed by four-point linear interpolation from three-dimensional map according to (N, Ga/N)
- $K_{TW}$ = EGR water temperature correction factor (See FIG. 16)
- $K_{Ta}$ = EGR intake air temperature correction factor (See FIG. 16)
- $K_P$ = EGR atmospheric pressure correction factor (See FIG. 16)
- A = preset pressure or critical pressure at which the pressure in diaphragm chamber (91 in FIG. 1) causes valve 97 to start moving against the spring force of spring 93.

Then, the current value $P_{d\ real}$ of the diaphragm chamber pressure (negative pressure) of the second EGR valve 9 is computed at the step 1048 from the following equation (7)

$$P_{d\ real} = P_A - P_D \quad (7)$$

where
- $P_A$ = atmospheric pressure (absolute pressure)
- $P_D$ = diaphragm chamber pressure (absolute pressure)

At the following steps the VSV 12 of FIG. 1 is controlled to be turned on and off so as to cause the actual diaphragm chamber pressure $P_{d\ real}$ to conform with the optimum control value $P_{d\ ref}$. More specifically, at the step 1049, if the actual diaphragm chamber pressure $P_{d\ real}$ is smaller than the control value $P_{d\ ref}$, the EGR controlling VSV 12 is turned on so that a regulated manifold vacuum is introduced and the pressure $P_{d\ real}$ is increased. If $P_{d\ real} > P_{d\ ref}$, the VSV 12 is turned off so that the atmospheric pressure is introduced into the chamber and the pressure $P_{d\ real}$ is reduced. At the next step 1052, the desired EGR advance angle $\theta_{EGR}$ is computed from the following equation (8) in accordance with the diaphragm chamber pressure $P_{d\ real}$ $$\theta_{EGR} = C\theta_{EGR} \times (P_{d\ real} - A) \quad (8)$$

where
- $\theta_{EGR} = 0$ when $P_{d\ real} - A < 0$
- $C\theta_{EGR}$ = constant
- A = preset pressure The following steps 1053 et seq., are program steps for controlling the air bleed VSV 15 of FIG. 1. In this case, the VSV 15 is controlled in such a manner that as the EGR rate is increased, the OFF period of the VSV 15 is increased and the amount of air flow in the air bleed 14 is decreased, thus decreasing the A/F ratio. Thus, at the step 1053 the desired duty cycle $D_{ref}$ for the on-off operation of the air bleed VSV 15 is computed from the following equation (9) first $$D_{ref} = CDREF \times (P_{d\ real} - A) \quad (9)$$

where
- $D_{ref} = 0$ when $P_{d\ real} - A < 0$
- CDREF = constant
- A = preset pressure In the 16-bit stored content H air stored at the specified address of the RAM 70, the respective bits indicate, in order of significance and occurrence, the history of the 16 previous ON ("1") and OFF ("0") periods of the air bleed VSV 15. Symbol $N_{ON}$ indicates the number of ON periods ("1s") in the history of the 16 previous periods. As a result, assuming that the expected value of the present decision at the decision step 1057 is fifty-fifty for the ON and OFF periods, the current duty cycle $D_{real}$ can be computed as shown at the step 1056. The latest value of $N_{ON}$ can be obtained by simply shifting the content $H_{air}$ to the left by one bit, checking whether the oldest bit is "1" or "0" and reducing the content by 1 if the bit is "1" or maintaining the content as such if the bit is "0" (at steps 1053 to 1055). As was the case in controlling the EGR controlling VSV 12, when the current duty cycle $D_{real}$ is smaller than the desired control value $D_{ref}$, the air bleed VSV 15 is opened so as to increase the value of $D_{real}$ (at step 1059) so that at the step 1060 the value of $N_{ON}$ is increased by 1 and the latest bit of the content $H_{air}$ is changed to "1". On the contrary, when $D_{real} > D_{ref}$, the VSV 15 is turned off and the value of $D_{real}$ is decreased (at step 1058). As a result, the air/fuel ratio of the mixture supplied to the engine is controlled at a value set in accordance with the EGR quantity. The present embodiment in which the on-off periods ratio or duty cycle of the air bleed VSV 15 is computed and the on-off operation of the VSV 15 is controlled directly by means of the CPU, has the effect of reducing the size of the hardware (circuits) and improving the response as compared with the prior art systems of the type in which the duty cycle is controlled by means of down counters, etc. In particular, by virtue of the fact that in this embodiment the current duty cycle is computed from the history of the 16 previous operations and the latest value is always used as the required sample for the duty cycle computation which is performed at intervals of 50 msec, the resulting response is improved extremely as compared with the prior art method in which the desired duty cycle is computed for example once for every 800 msec (50 msec × 16) and a sequence of on and off operations is performed in accordance with the computed desired duty cycle at intervals of 50 msec. The processing program has been described so far in connection with the control of EGR and the gear interrupt as well as the program interrupt will now be described.

Figure 19:
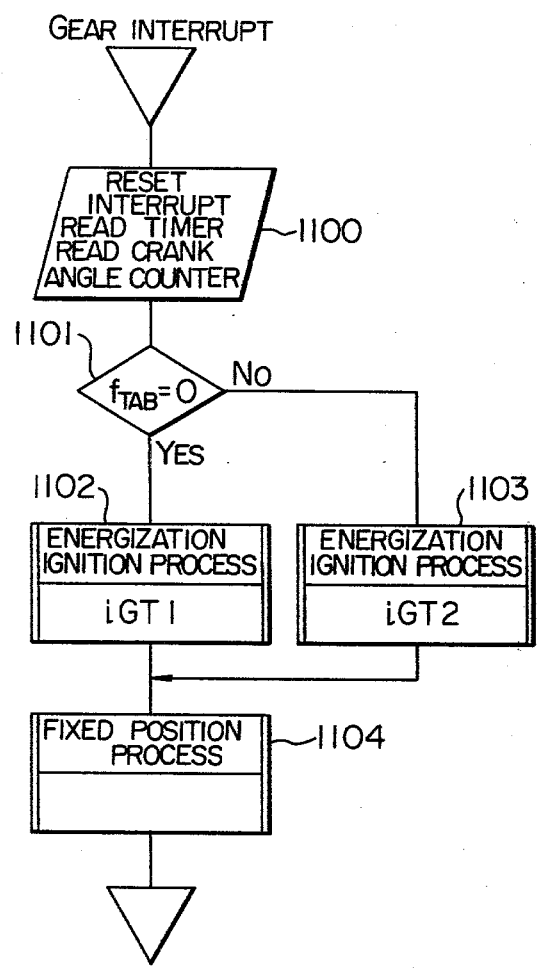

The gear interrrupt will be described first in reference to FIG. 19. The gear interrupt has the highest priority and is handled with top priority. This gear interrupt is initiated in response to a crank angle pulse applied from the terminal 444 of the interrupt control section 63 shown in FIG. 6. As a result, the gear interrupt is initiated at intervals of 30° CA from TDC. When the interrrupt is initiated, at a step 1100 the gear interrupt is reset (e.g., the flip-flop 302 of FIG. 6 is reset) and in response to the crank angle pulse the value latched in the registers 209 and 210 from the real-time timer (207, 208) of the time section 62 of FIG. 5 is read into the CPU 60. This operation allows the CPU 60 to detect the exact time of occurrence of the crank angle pulse with the accuracy of 8 μsec and the CPU 60 is allowed to detect the time of passing the crankshaft position corresponding to each of the 30° CA-intervals. In addition, by virtue of the read operation of the crank angle counter 125 in the crank angle counter section 61 shown in FIG. 4, the CPU 60 is allowed to detect the current crankshaft position with the accuracy of 30° CA.

In the description to follow, the current value of the crankshaft position represents one which is increased by 1. A step 1101 is a decision step for selecting the latest one of two computed value storage tables iGT1 and iGT2 of a Table 1 for the energization and ignition process. When a flag $f_{TAB}$ is "0", it is an indication that the table iGT1 is the latest one and if the flag $f_{TAB}$ is not "0", it is an indication that the table iGT2 is the latest one.

TABLE 1

Computed Value Storage Table iGT1 (iGT2)

- $\theta_x$: ignition angle
- $\theta_{X1}$: ignition gear position
- $\theta$: energization angle
- $\theta_1$: energization gear position
- $\theta'_{ON}$: allowable minimum dwell angle
- $f_A$: ignition computing flag A
- $f_B$: ignition computing flag B
- $\tau$: energization count-down value

TABLE 2

Coil Control Table CCT

- $\phi_A$: current value of coil A
- $\phi_B$: current value of coil B
- $S_A$: condition of coil A (0, 2, 4)
- $S_B$: condition of coil B (0, 2, 4)
- $\theta_A$: energization angle of coil A
- $\theta_{Ax}$: ignition angle of coil A
- $\theta_{Af}$: energization gear position of coil A
- $\theta_{Axf}$: ignition gear position of coil A
- $\theta_B$: energization angle of coil B
- $\theta_{Bx}$: ignition angle of coil B
- $\theta_{Bf}$: energization gear position of coil B
- $\theta_{Bxf}$: ignition gear position of coil B

TABLE 3

Fixed Position Processing

| Gear position | |
|---|---|
| 0 | Compute average rotation time $\tau m$ |
|   | Compute ignition delay angle $\theta_{DLY}$ |
|   | Update acceleration advance $\theta_{ACC}$ |
| 1 | Start measurement of time of 30° rotation |
| 2 | Measure time of 30° rotation |
|   | $1 \to f_{\theta 1}$, initiate program interrupt |
| 4 | Start measurement of time of 30° rotation, $0 \to S_B$ |
| 5 | Measure time of 30° rotation |
|   | $1 \to f_{\theta 1}$, initiate program interrupt |
| 6 | Compute average rotation time $\tau m$ |
|   | Compute ignition delay angle $\theta_{DLY}$ |
|   | Update acceleration advance $\theta_{ACC}$ |
| 7 | Measure time of 30° rotation |
| 8 | Measure time of 30° rotation |
|   | $1 \to f_{\theta 1}$, initiate program interrupt |
| 10 | Start measurement of time of 30° rotation, $0 \to S_A$ |
| 11 | Measure time of 30° rotation |
|   | $1 \to f_{\theta 2}$, initiate program interrupt |

Figure 20:
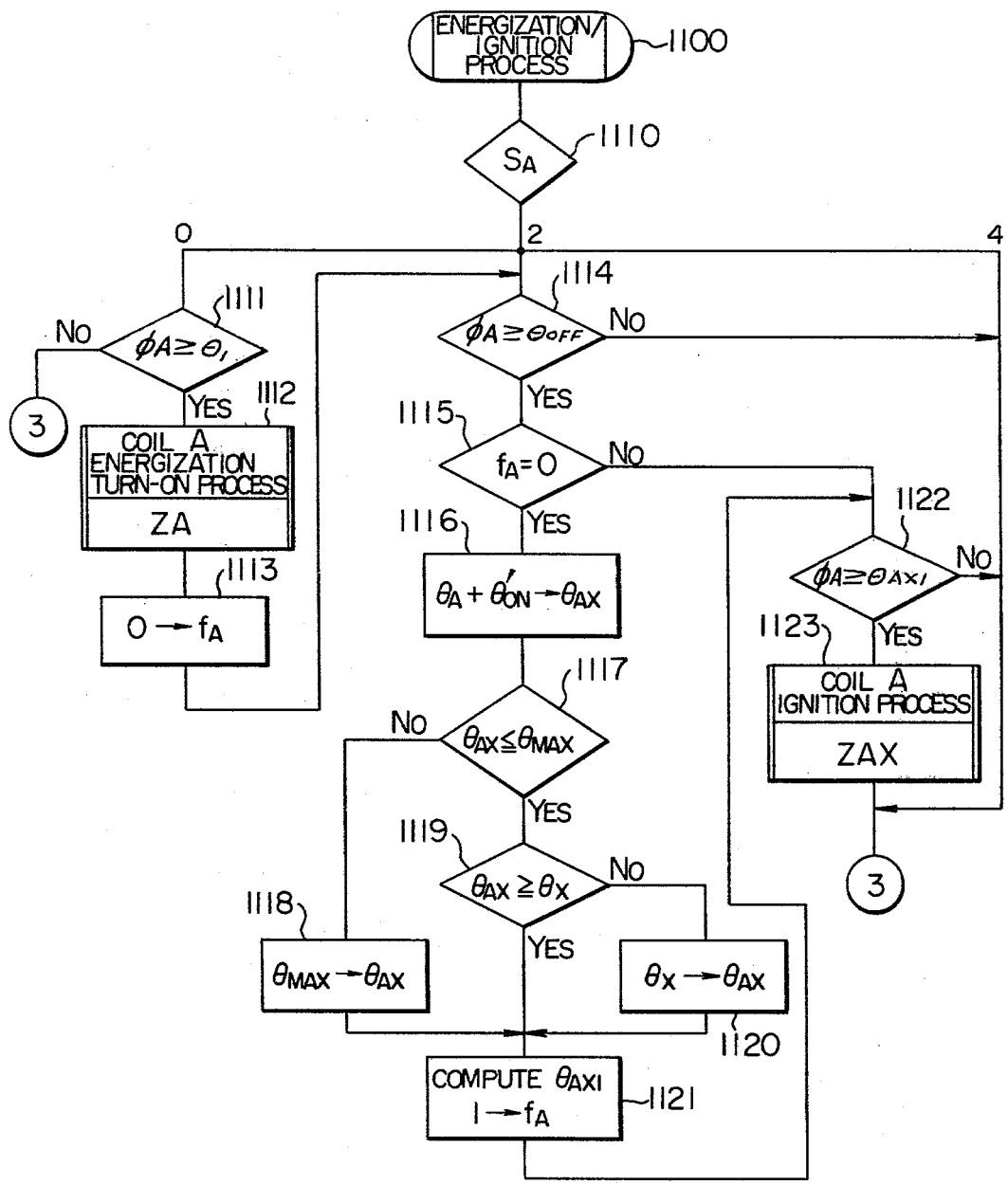
Figure 21:
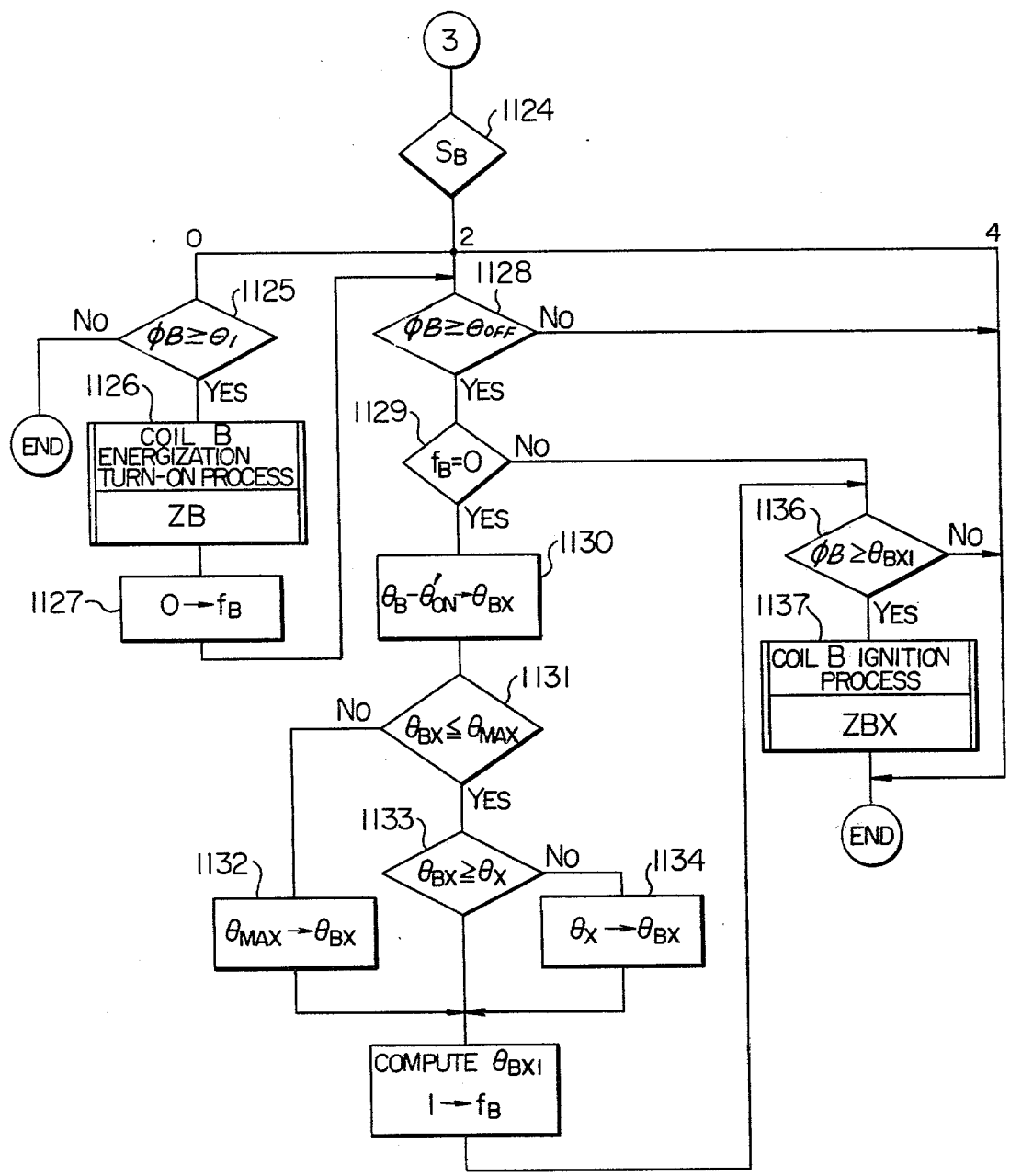
Figure 22:
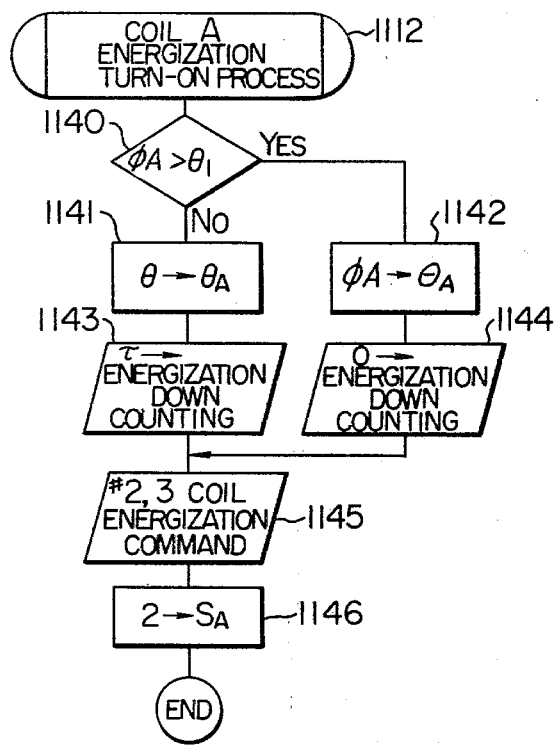

Table 1 shows the details of a computed value storage table iGT which will be computed by the program interrupt that will be described later. Thus, there is the possibility of a gear interrupt to be caused during the updating of the data of the table iGT and consequently the table iGT comprises two tables iGT1 and iGT2. FIGS. 20 and 21 illustrate the details of an energization and ignition processing step 1102 according to the table iGT1. An energization and ignition processing step 1103 according to the table iGT2 is equivalent to the step 1102 except that the data of the table iGT2 are used in place of the table iGT1. The energization and ignition process will now be described with reference to FIGS. 20 and 21. Firstly, at a step 1110 energization/ignition commands which have been generated for the coil A of the ignition coils 7 or the ignition coil for the No. 2 and 3 cylinders are examined. An ideal or desired coil-A condition $S_A$ is one of the flags shown in Table 2 and it is so arranged that "0" indicates an ideal before-energization condition, "2" an ideal energizing condition and "4" an ideal after-ignition condition. By "ideal" it is meant that the appropriate commands have been given to create the ideal condition, and, in fact, such a condition exists if the apparatus is all functioning properly. In other words, the flag $S_A$ is set to "0" at the gear position 11 (corresponding to 300° CA ATDC with respect to TDC of the coil B) of the fixed position process step 1104 shown in Table 3, set to "2" at a coil-A energization turn-on process step 1112 and set to "4" at a coil-A ignition process step 1123. In the before-energization condition with the coil-A condition $S_A$ being set to "0", the latest energization position value $\theta_1$ and the current gear position $\phi_A$ with respect to the TDC of the coil A (the No. 2 and 3 cylinders) computed by the program interrupt which will be described later, are compared at a step 1111 so that when $\phi_A \geq \theta_1$, the processing proceeds to a coil-A energization turn-on process step 1112, whereas when the current gear position $\phi_A$ has not reached the energization gear position, the processing proceeds to the coil-B process routine shown in FIG. 21. The coil-A energization turn-on process step 1112 is shown in FIG. 22. Whether $\phi_A > \theta_1$ or $\phi_A = \theta_1$ is examined at a step 1140. The relation $\phi_A > \theta_1$ is established when the latest value of the energization gear position is advanced with respect to the just preceding value, such as when the engine is accelerated, the ignition angle $\theta_x$ is advanced considerably, the battery voltage is decreased suddenly or the like. In this case, the current position has already passed through the position at which the energization is to be effected so that as will be seen from steps 1142 and 1144, in order that the coil A may be readily energized in response to the next crank angle pulse, the energization down counters 900 and 901 of FIG. 11 are set to "0" at the step 1144 and a coil-A energization command is generated at the next step 1145. In the ordinary case where the relation $\phi_A = \theta_1$ is established, the processing proceeds to a step 1143 to set the computed value $\tau$ in the energization down counters and a coil-A energization command is generated at the step 1145. When this occurs, as already mentioned in connection with the description of the operation of the circuits shown in FIG. 11, after the completion of the down counting which starts in response to the next crank angle pulse, the coil-A igniter signal changes from "1" to "0" as shown in (i) of FIG. 3. The coil-A energization angle set at the steps 1141 and 1142 represents the latest and actual crank angle at which the energization is initiated and it is used at the following steps. The previously mentioned coil A condition $S_A$ is set to "2" at a step 1146. Then, a coil-A ignition computing flag $f_A$ is set to "0" at the next step 1113. This flag $f_A$ is one which requires that the ignition angle $\theta_x$ computed at the ESA computing step of the program interrupt be corrected in accordance with the actual energization initiation crank angle $\theta_A$ so as to prevent misfiring and ensure the desired energization ON-period. The request for corrective computation or the flag $f_A$ is set to "0" after the above-mentioned initiation of energization and the execution of the ESA computation which will be described later. Then, when the coil A condition $S_A$ is "2" or the coil is being energized, the processing proceeds to a step 1114 to determine whether the ignition process is required by the gear position. The ignition advance angle is always in the range of 0° to 70° CA BTDC and consequently it is necessary to perform the coil-A ignition process only at the gear positions 9 to 11 (i.e., at 30°, 60° and 90° CA BTDC, if the TDC of the No. 2 and 3 cylinders is 0° CA). As a result, $\theta_{OFF}=9$ in this embodiment. When the coil-A current position $\phi A$ satisfies the relation $\phi A \geq \theta_{OFF}$, the processing proceeds to a step 1115. Otherwise, the processing proceeds to the coil-B process routine of FIG. 21. At the step 1115, if the coil-A ignition computing flag $f_A$ is "0", the previously mentioned corrective computation of the ignition angle $\theta_x$ is performed. Firstly, at a step 1116 the allowable maximum advance ignition angle in terms of the energization period is computed as $\theta_{Ax}$ in accordance with the actual energization angle $\theta_A$ and the allowable minimum dwell angle $\theta'_{ON}$ (the minimum energization period required for the engine normal combustion which is expressed in terms of crank angle degrees according to the current speed) which was computed by the program interrupt. At a step 1119, the angle $\theta_{Ax}$ is compared with the optimum ignition angle $\theta_x$ computed at the ESA computing step of the program interrupt, so that when $\theta_x \leq \theta_{Ax}$, the angle $\theta_{Ax}$ is selected, whereas when $\theta_x > \theta_{Ax}$, the angle $\theta_x$ is selected, and the selected angle is written anew as the actual coil-A control ignition angle $\theta_{Ax}$ into the coil control table CCT shown in Table 2. More specifically, the highest priority is given to the prevention of misfiring so that when the latest value of the ignition advance is excessively advanced, the angle $\theta_{Ax}$ computed at the step 1116 is selected as the upper limit value so as to ensure the required energization period. However, if the maximum allowable advance ignition angle is reached after the top dead center (TDC) as will be seen from steps 1117 and 1118, the top dead center ($\theta_{MAx}=360°$ CA) is selected as the actual ignition angle $\theta_{Ax}$. Generally, where the ignition timing is controlled by making computations by a computer in synchronism with crank angles, in accordance with the known methods every energization and ignition computation is used for controlling one or more energization and ignition operations and the energization timing and ignition timing computed simultaneously with the energization and ignition computation are used as such for the actual control. As a result, there has not been any practice to make a further energization and ignition computation during the energization of the coil and thereby to compute a new ignition timing. With the advent of high-speed computers, particularly at low engine operation, it is now possible to initiate two or more energization and ignition computations for every ignition and use the latest one of the computed values. In the actual control of an automobile engine whose number of revolutions increases by one place such as from 600 to 6000 rpm, in consideration of the fact that it has been the practice to initiate the energization and ignition computation earlier due to the limited time available for the energization and ignition computation at high engine speeds, a method in which the energization and ignition computation is initiated several times for every ignition and the latest one of the computed values available for the actual control is used will be effective in remarkably improving the transient response during the periods of acceleration and improving the drivability. While, in this embodiment, four energization and ignition computations are initiated for every crankshaft revolution, it is possible to perform the desired computation in response to each of crank angle pulses generated at intervals of 30° crank angle by using a higher-speed computer. While no description has been made in connection with the embodiment, even if the energization and ignition computation is performed by time synchronization (e.g., the 8 msec processing step of this embodiment) in place of the crank angle synchronization or another method (e.g., the Ford EEO) of performing the computation by means of the main routine, it is necessary to perform the recomputation of the actual ignition timing shown by the steps 1116 to 1121 of FIG. 20. In particular, where the double coil system is used and the energization turn-on timing is settable two times (0° to 360° CA) as early as the ordinary single coil type (0° to 180° CA) as in the case of this embodiment, the utilization of this merit involves the possibility of the energization turn-on timing and the ignition timing being separated considerably and consequently the above-mentioned readjustment of the ignition timing is essential for reducing the occurrence of abnormal combustions due to the energization period, such as misfiring. At the step 1121, a control ignition gear position $\theta_{Axl}$ is computed from the equation (2) in accordance with the actual coil-A control ignition angle $\theta_{Ax}$ and the coil-A ignition computing flag $f_A$ is returned to "1".

Figure 24:
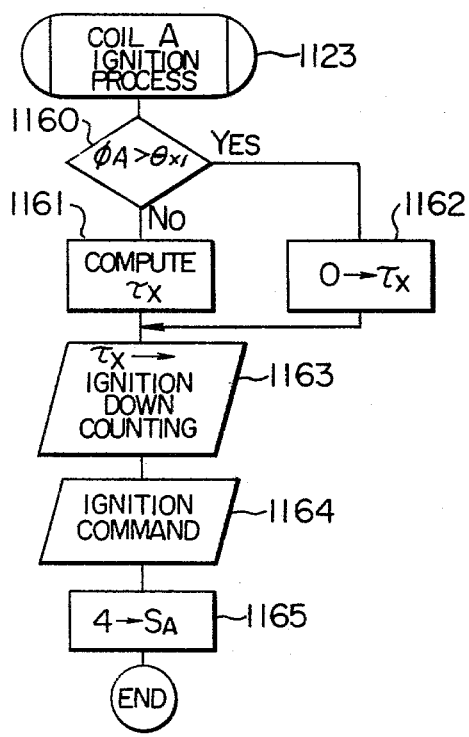

Then the program proceeds to a step 1122. The program proceeds directly to the step 1122, if the flag $f_A$ is not "0" at the step 1115. At the step 1122, the coil-A control ignition gear position $\theta_{Axl}$ is compared with the current gear position $\theta A$. When $\phi A \geq \theta_{Axl}$, the program proceeds to the next coil-A ignition processing step 1123. When $\phi A < \theta_{Axl}$, no processing is performed and the program proceeds to the coil-B processing routine of FIG. 21. FIG. 24 shows a detailed flow chart for the step 1123. FIG. 24 is substantially the same with FIG. 22 and whether $\phi A > \theta_{Axl}$ or $\phi A = \theta_{Axl}$ is examined first at a step 1160. The relation $\phi A > \theta_{Axl}$ will be established when the ESA computing step is completed just before the gear interruption so that a new ignition timing value is made available and the newly computed value is advanced with respect to the preceding computed value. In this case, the current position has passed the position at which the ignition is to be effected, with the result that the ignition down counters 902 and 903 of the energization/ignition control section 69 shown in FIG. 11 are set to "0" at steps 1162 and 1163 and an ignition command is generated at a step 1164. Consequently, a col-A ignition signal is readily sent to the second igniter 81 of the igniter 8 in response to the next crank angle signal. When $\phi A = \theta_{Axl}$, the ignition down counters 902 and 903 of the energization/ignition control section 69 will be set to an ignition count-down value $\tau x$ which is computed from the equation (2) or the following equation (2A) at a step 1161

$$\tau x = \tau x(\theta_{Ax} - \theta_{Axl}) \tag{2A}$$

where $\theta_{Ax}$=control ignition angle of coil A $\theta_{Axl}$=control ignition gear position of coil A As mentioned previously, the count-down value $\tau x$ represents any given point between the adjacent gear positions (at intervals of 30° CA) which is expressed in terms of the required time from the lower-valued gear position. At a step 1163, the count-down value $\tau x$ is set in the ignition down counters and a coil-A ignition command is generated at a step 1164. When this occurs, as mentioned previously, the down counting is started in response to the crank angle pulse following the generation of the ignition command and upon completion of the down counting the coil-A igniter signal changes from "1" to "0" as shown in (i) of FIG. 3, thus effecting the ignition. At the next step 1165, the coil-A condition $S_A$ is set to "4" and the coil-A ignition processing step is completed. The processing routine of the coil A has been described so far and the processing routine of the coil B shown in FIG. 21 will now be described. The processing routine of the coil B is all the same with that of the coil A. Since the current gear position $\phi B$ is given in reference to the TDC for the No. 1 and 4 cylinders (the coil B), it is displaced 180° CA from the current position $\phi A$ and the following equation (10) holds $$\phi B = \phi A + 6 \text{ (mode 12)} \tag{10}$$

Figure 23:
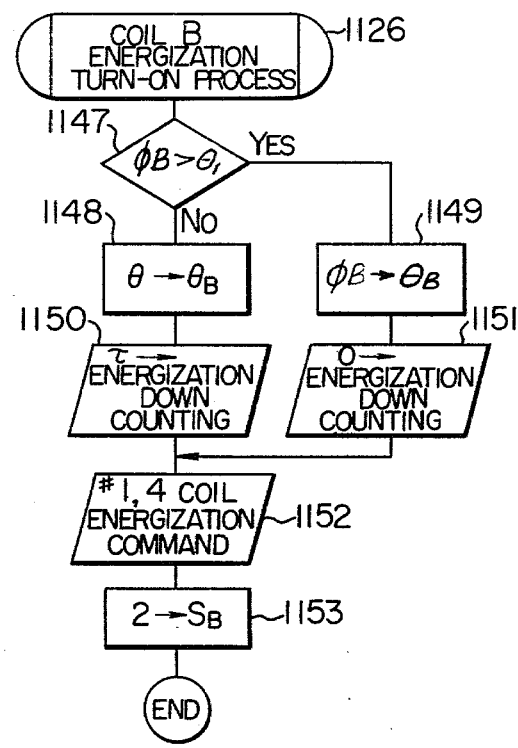
Figure 25:
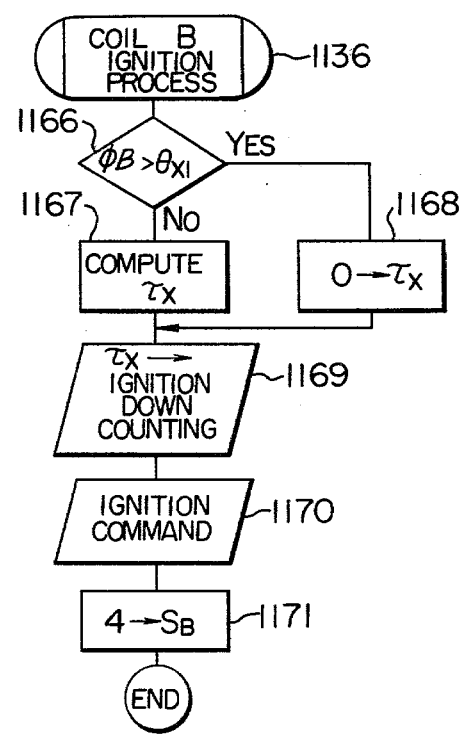

FIG. 23 shows the energization turn-on processing step of the coil B and FIG. 25 shows the ignition processing step of the coil B. The gear interrupt energization and ignition processing steps 1102 and 1103 have been described so far and now the fixed position processing step 1104 will be described. The details of the fixed position processing routine are shown in Table 3 and the routine performs the initiation of program interrupts and the computation of ignition delay angle $\theta_{DLY}$ and acceleration advance angle $\theta_{ACC}$. The gear positions shown in Table 3 can be obtained through the read operation of the crank angle counters at the step 1100 and the gear position represents the current gear position $\phi B$ itself according to the energization and ignition processing routine. Since a crank angle pulse is generated for every 30° CA and since 12 pulses are generated for every crankshaft revolution, the current gear position $\phi B$ assumes a value in the range of 0 to 11. In accordance with the values of $\phi B$, the various processes shown in Table 3 are performed. At the gear positions "0" (the TDC for the No. 1 and 4 cylinders) and "6" (the TDC for the No. 2 and 3 cylinders), respectively, the average rotational time $\tau m$ (the rotation time of 60° CA) is obtained by adding together the times of the two previous 30° CA rotations which will be described later. The ignition delay angle $\theta_{DLY}$ is computed from the following equation (11) in accordance with the average rotation time $\tau m$. This represents the delay of an ignition signal due to the igniter and it is given in terms of crank-angle degrees.

$$\theta_{DLY} = tDLY/\tau m \tag{11}$$

where tDLY is the delay time (40 to 100 μsec) of an ignition signal due to the igniter.

On the other hand, the acceleration advance angle $\theta_{ACC}$ computed by the 50 msec processing of FIG. 18 is decreased or retarded by a fixed angle (0.05 to 0.5° CA) for every half revolution. In this embodiment, the number of revolutions is computed in accordance with the required time $\tau N$ for rotation of 30° CA. As will be seen from Table 3, there are four measuring time intervals for every revolution and they are $\phi B = 1$ to 2 (30° to 60° CA), $\phi B = 4$ to 5 (120° to 150° CA), $\phi B = 7$ to 8 (210° to 240° CA) and $\phi B = 10$ to 11 (300° to 330° CA). The figures in parenthesis indicate the crank angles given in terms of the TDC for the No. 1 and 4 cylinders as 0° CA. The measuring method of this embodiment will now be described by way of the method of measuring the time of 30° to 60° rotation. The passing times $t_{30}$ and $t_{60}$ of the 30° CA and 60° CA gear positions are computed by the timer latch read operation at the first step 1100 of the gear interrupt shown in FIG. 19. Thus, the rotation time $\tau N$ can be obtained from the following equation (12)

$$\tau N = t_{60} - t_{30} \text{(in units of 8 μsec)} \tag{12}$$

Figure 30:
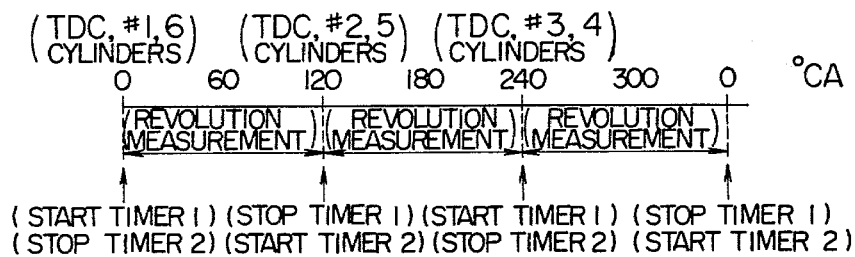
FIGS. 30 and 31 are diagrams useful for explaining the operation of the invention.

With the usual method of measuring the number of revolutions, however, the usual practice has been such that in response to a crank angle pulse corresponding to the 30° CA gear position a rotation time measuring timer is reset and started and in response to a crank angle pulse corresponding to the 60° CA gear position the timer is stopped and simultaneously a revolution measuring routine is initiated to read the content of the timer into the CPU. FIG. 30 illustrates by way of example the application of this method to a six cylinder engine. In the case of FIG. 30, the rotation time of 120° CA is measured, thus requiring two timer registers. In addition, it is necessary to use a control circuit for resetting, starting and stopping the timer registers 1 and 2 and a selector circuit for the timer registers 1 and 2. On the contrary, if the measuring method of this embodiment employing the single real-time timer responsive to a crank angle pulse to latch the then current value of the timer in the registers is applied to the case of FIG. 30, the desired rotation times can be measured by the operation of subtraction between the values latched at 0°, 120° and 240° CA and the circuit construction can be simplified greatly. In particular, where the energization and ignition computation is performed several times for each ignition, due to the necessity of using the latest number of revolutions for each energization and ignition computation, there is the possibility of the revolution measuring intervals overlapping each other, such as 0° to 120° CA, 60° to 180° CA and so on. This is due to the fact that the revolution measuring interval cannot be made so short due to the necessity of minimizing the effect of variations in revolutions due to the engine combustion cycles. In this case, if a rotation time measuring method of starting and stopping timer registeres as shown in FIG. 30 is used, there is the disadvantage of requiring a greater number of timer registers and greatly complicating the required selector circuit. On the contrary, if the method of this embodiment is used, there is a great advantage that from a circuit point of view the measurements can be accomplished by all the same circuit construction as used in this embodiment requiring only the additional use of the subtraction by the program.

Another function of the fixed position processing is to initiate the program interrupt. This is a routine for performing the ESA computation or the energization and ignition computation and this interrupt is initiated at each of the gear positions "2" ($\phi B = 60°$ CA), "5" ($\phi B = 150°$ CA), "8" ($\phi B = 240°$ CA) and "11" ($\phi B = 330°$ CA) or just after the completion of each revolution measurement as shown in Table 3. The interrupt is initiated when the flip-flop 301 of the interrupt control section 63 shown in FIG. 6 is set by the signal applied from the terminal 441 and the program interrupt request signal (at terminal 445) goes to "0". The priority of the program interrupt is second to the gear interrupt so that the program interrupt is initiated immediately after the completion of the gear interrupt processing routine of FIG. 19 and the ESA computation, etc., are performed. While the gear interrupt processing routine has been described, in view of the nature of the gear interrupt its processing must be completed within the crank angle pulse width (30° CA). The reason is that any delay in the processing of the interrupt tends to cause loss of the accurate gear position. As a result, the processing time must be held within 30° CA or about 800 μsec which is available at the most severe speed of 6000 rpm in practice.

Figure 26:
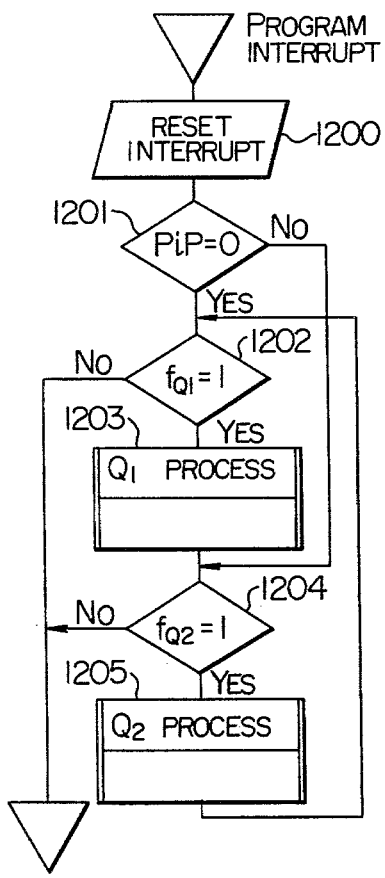
Figure 27:
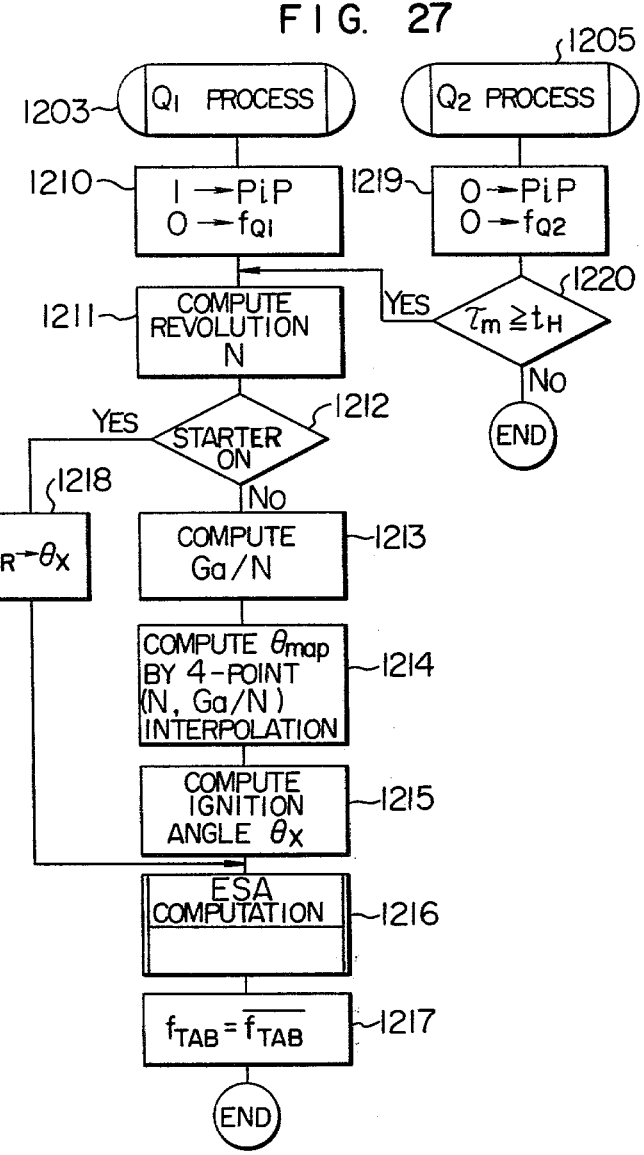

Finally, the program interrupt processing routine shown in FIG. 26 will be described. This program interrupt processing routine represents a program which must essentially be dealt with by the gear interrupt. Because the best control response will be ensured, if the number of revolutions N or the most important parameters for the energization and ignition computation is performed by the gear interrupt and if the energization and ignition computation is initiated at the step immediately following the measurement of the revolutions. However, the maximum time required for the execution of this program interrupt processing routine is about 1.5 msec. Consequently, since the allowable processing time of the gear interrupt is 800 μsec as mentioned previously, the program interrupt processing routine cannot be combined with the gear interrupt processing routine. At present, the processing speed of computers has been steadily progressing toward higher speeds and it is expected that the processing time of the energization and ignition computation will be decreased. At the same time, however, there is the tendency toward increasing the number of crank angle position signals (crank angle pulses) for the purpose of more accurately controlling the ignition timing and thus there is the possibility of a decrease in the allowable processing time of the gear interrupt. Also, due to the tendency toward increasingly diversified and elaborate engine controls with the resulting complication of the control operations, there is the tendency toward increasing the processing time. Thus, particularly where, as in this embodiment, a control method is used in which a command is generated from the CPU and the down counting is started in response to the following crank angle pulse, there will be an increase in the number of operations which must be dealt with by the gear interrupt and the processing time will also be increased, thus making the use of the program interrupt essential. There is another method of processing the energization and ignition computation with a lower level routine other than the program interrupt, such as a main routine and this method is also disadvantageous in that the reflection of the number of revolutions N measured by the gear interrupt will be delayed as mentioned previously and the response of the ignition system will be deteriorated. The program interrupt processing routine will now be described with reference to FIG. 26. At the first step 1200, a reset signal is applied to the terminal 442 of the interrupt control section 63 shown in FIG. 6 so that the flip-flop 301 is reset and the program interrupt request signal at the terminal 445 is returned to "1". The processing proceeds to the next step 1201 and a process decision flag PiP is examined. When the flap PiP is "0", that is, a $Q_2$ process was performed by the preceding program interrupt, the processing proceeds to the next step 1202. When the flag PiP is "1", that is, when a $Q_1$ process was performed by the preceding program interrupt, the processing proceeds to a step 1204. At the step 1202 or 1204, a $Q_1$ process flag $fQ_1$ or $Q_2$ process flag $fQ_2$ is examined so that when the flag $fQ_1$ or $fQ_2$ is "1", the processing proceeds to a $Q_1$ process step 1203 or a $Q_2$ process step 1205. When the flag $fQ_1$ or $fQ_2$ is "0", the program interrupt processing routine is completed. In accordance with the fixed position processing of the gear interrupts shown in Table 3, the $Q_1$ process flag $fQ_1$ is set to "1" at the gear positions "2" ($\phi B = 60°$ CA) and "8" ($\phi B = 240°$ CA), respectively, and it is reset to "0" upon execution of the $Q_1$ process step 1203. The $Q_2$ process flag $fQ_2$ is set to "1" at the gear positions "5" ($\phi B = 150°$ CA) and "11" ($\phi B = 330°$ CA), respectively, and it is reset to "0" upon execution of the $Q_2$ process step 1205. The details of the $Q_1$ process step 1203 and the $Q_2$ process step 1205 are shown in FIG. 27. In the case of the $Q_2$ process, the energization and ignition computation at steps 1211 et seq., is performed at low engine speeds such as 4000 rpm or below. In other words, at the step 1220 the average rotation time τm computed by the gear interrupt is compared with the value of tH (the rotation time of 30° CA corresponding to 4000 rpm) so that when τm ≧ tH at the low speed operation, the processing proceeds to the step 1211 and then the energization and ignition computation is performed. On the contrary, when τm < tH at the low speed operation, the computation is not performed and the $Q_2$ process is ended. At the step 1211, the number of revolutions N is computed from the passing times of the crank angle pulses which have been described in connection with the fixed position processing of the gear interrupts. In the case of the $Q_2$ process initiated at the gear position "2" ($\phi B = 60°$ CA), the number of revolutions N is computed from the reciprocal of τN obtained from the equation (12) in accordance with the following equation (13)

$$N = 8/\tau N \times (30/360) \times 60 \times 10^6 (\text{rpm}) \tag{13}$$

where τN is given in units of 8 μsec.

At the next step 1212, the signal from the starter switch 23 shown in FIG. 1 is examined so that when the switch is "ON", a fixed value $\theta_{CR}$ is selected as the desired ignition angle $\theta_x$. When the switch is "OFF", the processing proceeds to the step 1213 and the air flow rate Ga/N per revolution is computed from the number of revolutions N and the air flow rate Ga written into the corresponding address of the RAM 70 by the DMA procedure. At the next step 1214, from a map showing the base advance angles $\theta_{MAP}$ given in correspondence with the numbers of revolutions N and the air flow rates Ga/N and stored in the ROM 71, the values at four points which satisfy the following relations (14) and (15) with respect to the value of (N, GA/N) computed at the steps 1211 and 1213, that is, $\theta_{MAP1} = (N_1, (Ga/N)_1)$, $\theta_{MAP2} = (N_1, (Ga/N)_2)$, $\theta_{MAP3} = (N_2, (Ga/N)_1)$ and $\theta_{MAP4} = (N_2, (Ga/N)_2)$ are read out. In this embodiment, the base advance angle map stores the necessary base advance angle data as shown in Table 4 in which the values of Ga/N range from 0.001 (g/cm³, rpm) to 0.016 (g/cm³, rpm) in 0.001 (g/cm³, rpm) steps and the values of N range from 500 (rpm) to 1000 (rpm) in 100 (rpm) steps and from 1000 (rpm) to 6000 (rpm) in 500 (rmp) steps, and the map is a two-dimensional map having (16×16=) 256 points.

TABLE 4

| | Base Advance Angle $\theta_{MAP}$ Table | | | | | | | | | | | | | | | |
|---|---|---|---|---|---|---|---|---|---|---|---|---|---|---|---|---|
| N | | | | | | | | | rpm | | | | | | | |
| Ga/N | 500 | 600 | 700 | 800 | 900 | 1000 | 1500 | 2000 | 2500 | 3000 | 3500 | 4000 | 4500 | 5000 | 5500 | 6000 |
| .001 | | | | | | | | | | | | | | | | |
| .002 | | | | | | | | | | | | | | | | |
| .003 | | | | | | | | | | | | | | | | |
| .004 | | | | | | | | | | | | | | | | |
| .005 | | | | | | | | | | | | | | | | |
| .006 | | | | | | | | | | | | | | | | |
| .007 | | | | | | | | | | | | | | | | |
| .008 | | | | | | | | | | | | | | | | |
| .009 | | | | | | | | | | | | | | | | |
| .010 | | | | | | | | | | | | | | | | |
| .011 | | | | | | | | | | | | | | | | |
| .012 | | | | | | | | | | | | | | | | |
| .013 | | | | | | | | | | | | | | | | |
| .014 | | | | | | | | | | | | | | | | |
| .015 | | | | | | | | | | | | | | | | |
| .016 | | | | | | | | | | | | | | | | | g/cm³, rpm $$N_1 < N < N_2 \quad (14)$$
$$(Ga/N)_1 < (Ga/N) < (Ga/N)_2 \quad (15)$$

At the step 1214, the necessary linear interpolation computation is performed with respect to N from the following equations (16) and (17) in accordance with the above-mentioned four-point values.

$$\theta_{MAP5} = \frac{\theta_{MAP3} - \theta_{MAP1}}{N_2 - N_1} \times (N - N_1) + \theta_{MAP1} \quad (16)$$

$$\theta_{MAP6} = \frac{\theta_{MAP4} - \theta_{MAP2}}{N_2 - N_1} \times (N - N_2) + \theta_{MAP2} \quad (17)$$

Then, the desired linear interpolation computation is performed with respect to (Ga/N) from the following equation (18) to obtain the desired base advance angle $\theta_{MAP}$.

$$\theta_{MAP} = \frac{\theta_{MAP6} - \theta_{MAP5}}{(Ga/N)_2 - (Ga/N)_1} \times \{(Ga/N) - (Ga/N)_1\} + \theta_{MAP5} \quad (18)$$

Figure 28:
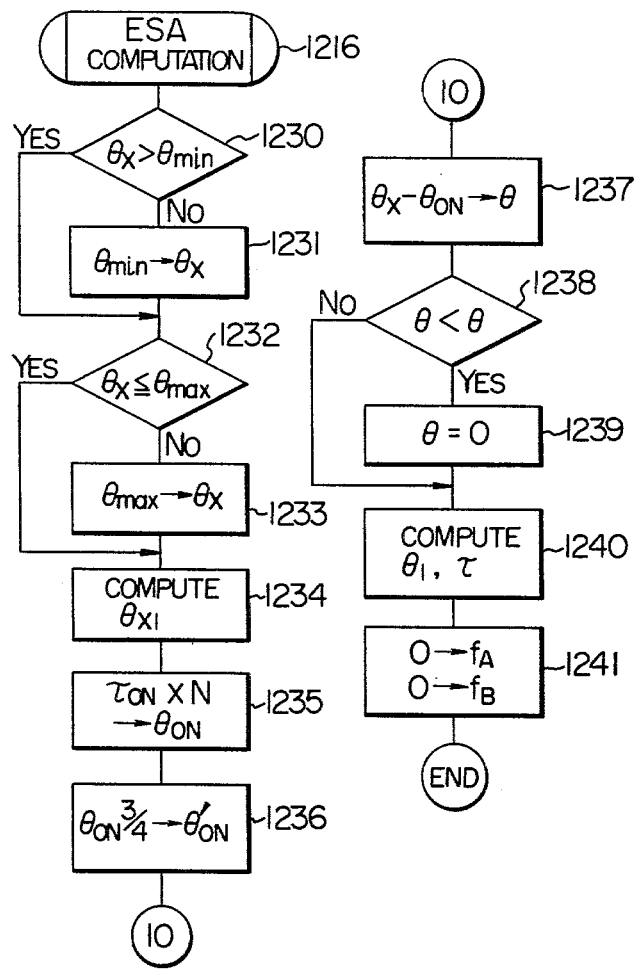

At the step 1215, various correction advance angles are added to the base advance angle and the desired ignition angle $\theta_x$ is computed from the following equation (19)

$$\theta_x = TDC - (\theta_{MAP} + \theta_{EGR} + \theta_{ACC} + \theta_{WT} + \theta_{DLY}) \quad (19)$$

where $\theta_{EGR}$=EGR advance angle—See equation (8), 50 msec processing $\theta_{ACC}$=acceleration advance angle—See equation (5), 50 msec processing, fixed position processing $\theta_{WT}$=water temperature advance angle—main routine $\theta_{DLY}$=ignition delay angle—See equation (11), fixed position processing After the steps 1213 and 1215 have been performed, the processing proceeds to the ESA computing step 1216 shown in FIG. 28. At the ESA computing step shown in FIG. 28, the processes required for adjusting the ignition angle into the range of $\theta_{MIN}(TDC-70° CA)$ to $\theta_{MAX}(TDC)$ are performed at steps 1230 to 1233. At the next step 1234, an ignition gear position $\theta_{xI}$ is computed from the equations (2). At the next step 1235, the energization ON period $\tau ON$ computed from the battery voltage by the 8 msec processing routine shown in FIG. 17, is converted into the corresponding energization ON duration angle or the dwell angle $\theta_{ON}$ in accordance with the number of revolutions N computed at the step 1211. At the next step 1236, the allowable minimum dwell angle $\theta'_{ON}$ is computed from the dwell angle $\theta_{ON}$. In this embodiment, the value equal to 75% of the dwell angle $\theta_{ON}$ is substituted for the allowable minimum dwell angle $\theta_{ON}$. At the next step 1237, the desired energization angle $\theta$ is computed from the ignition angle $\theta_x$ and the dwell angle $\theta_{ON}$. At the following steps 1238 and 1239, the energization angle $\theta$ is adjusted to the upper limit of the energization to attain $\theta \geq 0$. At the next step 1240, the desired energization gear position $\theta_1$ and energization count-down value $\tau$ are computed as shown by the equations (1). Lastly, the previously mentioned ignition computing flags $f_A$ and $f_B$ are set to "0". The computed values obtained according to the $Q_1$ and $Q_2$ processes are then written into the computed value storage table iGT. The table iGT comprises two tables (iGT$_1$, iGT$_2$). Thus, when a flag $f_{TAB}$ is "0", the values are written into the table iGT$_2$, whereas when the flag $f_{TAB}$ is "1", the values are written into the table iGT$_1$. After the completion of the writing, the flag $f_{TAB}$ is changed in state at the 1217.

Figure 31:
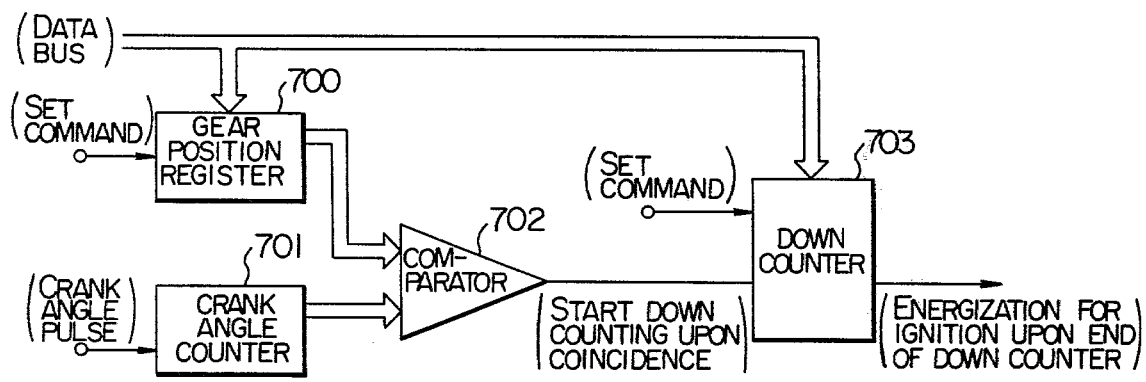

Thus, the present embodiment employs the method of generating an ignition command and an energization command from the CPU and initiating the down counting in response to the crank angle pulse just following the commands. However, a more usual method is so designed that as shown in FIG. 31, a gear position register 700 is used, whereby each time a crank angle pulse is received, the content of a crank angle counter 701 (in this embodiment, the counters 207 and 208 of the timer section 62 shown in FIG. 5) is compared with the content of the gear position register 700 by a comparator 702 and a down counter 703 starts to count down when the equality is found between the contents. However, where a high performance CPU is used, the cost can be reduced by designing so as to realize the desired functions by means of the software (programs) as far as possible and thereby to minimize the hardware (circuits) used. The reason is that any slight increase in the number of program steps will not increase the cost so far as the increase does not increase the number of the ROM 71. The present embodiment takes this point into account and the down counting is initiated in response to the command from the CPU. In this connection, if a higher performance CPU is used, it is possible to initiate the down counting by means of the timer incorporated in the CPU so as to directly apply an ON (energization start) command and an OFF (ignition) command to the igniter. While the present embodiment has been described as applied to a four cylinder double coil type engine, the invention can be used with any of the ordinary engines including those employing EFI (electronically controlled fuel injection system) irrespective of the number of cylinders and the types of ignition. In particular, the invention can be readily applied to an electronically controlled fuel injection system, if only the ignition down counters 902 and 903 of the energization/ignition control section 69 shown in FIG. 11 are used as injection ending down counters and the energization starting down counters 900 and 901 are used as injection starting down counters, if the fuel injection quantity or the fuel injection time is computed from the air flow rate Ga and the engine speed N and an injection start crank angle $\theta$ and an injection ending crank angle $\theta_x$ are computed and if the fuel injection valves are connected in place of the igniters 80 and 81 of FIG. 12. It has been found that if the invention is applied to an EFI, it is desirable to design so that the fuel injection will be ended within a predetermined allowable crank angle at which the engine intake valve starts to open. Thus, in the like manner as the control of the ignition system according to the invention, the time to open the injection valve (i.e., the duration of valve opening) is computed first and during the time the valve is open the latest valve closing timing is computed from a new engine condition data. When a computed value is obtained, the computed value is subjected to a comparison to see whether the value is within a predetermined crank angle at which the intake valve starts to open and a corrective computation is performed in accordance with the result of the comparison so as to make the computed value assume the optimum value within the predetermined allowable crank angle at which the intake valve starts to open. While, in this embodiment, the air flow rate Ga is used in the computation of ignition timing, fuel injection quantity and EGR quantity, it is of course possible to apply the invention to cases where any of other engine condition parameters such as intake manifold vacuum, throttle opening, etc., are used.

We claim:

1. A method for controlling an ignition system of a combustion engine wherein a starting time of energization of an ignition coil and an energization stopping time are determined by a microcomputer at predetermined intervals, said method comprising the steps of:
   detecting engine operating parameters for determining said energization starting time and said energization stopping time;
   determining whether said ignition coil has been commanded to be in a before-energization condition or in an energization condition;
   providing an energization starting signal in accordance with a latest result determined by said microcomputer, when said ignition coil is determined to be in said before-energization condition;
   determining an optimal energization stopping time after said energization starting signal has been provided;
   providing an energization stopping signal in accordance with a latest said optimal stopping time determination; and
   controlling the energization of said ignition coil in response to said energization starting signal and said energization stopping signal from said microcomputer.

2. A method as in claim 1 wherein said optimal stopping timing determining step comprises the steps of:
   adjusting said energization stopping time after each said energization stopping time determination to maintain a predetermined minimum period between said starting signal and said stopping signal; and
   adopting said adjusted energization stopping time as said optimal energization stopping time.

3. A method for controlling an ignition system of a combustion engine wherein a starting time of energization of an ignition coil and an energization stopping time are determined by a microcomputer at predetermined intervals, said method comprising the steps of:
   detecting engine operating parameters for computing said energization starting time and said energization stopping time;
   determining whether said ignition coil has been commanded to be in a before-energization condition or in an energization condition;
   providing an energization starting signal in accordance with a latest result determined by said microcomputer, when said ignition coil is determined to be in said before-energization condition;
   determining an allowable maximum advance energization time from an actual energization time and a predetermined minimum dwell period, when said ignition coil is determined to be in said energization condition;
   comparing said allowable maximum advance energization time with a latest determined energization stopping time obtained after starting the energization of said ignition coil;
   providing an energization stopping signal from said microcomputer at said allowable maximum advance energization time, when said latest determined energization stopping time is determined in said comparing step to be in advance of said allowable maximum advance energization time;
   providing an energization stopping signal from said microcomputer at said latest computed energization stopping time, when said latest computed energization stopping time is determined to be lagging behind said allowable maximum advance energization time; and
   controlling the energization of said ignition coil in response to said energization starting signal and said energization stopping signal from said microcomputer.

4. An apparatus for controlling an internal combustion engine having an output shaft rotated by the combustion of air-fuel mixture ignited by a spark voltage generated by an ignition coil, said apparatus comprising:
   sensor means sensing operating conditions of said engine and developing sensor binary signals indicative of said sensed operating conditions;
   memory means memorizing a predetermined control program;
   processor means responsive to said sensor means and said memory means for developing a first and second binary signals indicative of coil energization and deenergization instants defining rotational positions of said output shaft, respectively, by:
   repeatedly calculating said coil deenergization instant by using said sensor binary signals, discriminating whether said ignition coil has been commanded to be under energized condition or not, determining, when said discrimination result is positive, an optimum coil deenergization instant, and generating said second binary signal in response to said optimal coil deenergization instant; and igniter means connected to said processor means and said ignition coil for energizing and deenergizing said ignition coil at the rotational positions defined by said first and second binary signals.

5. An apparatus for controlling an internal combustion engine having an output shaft rotated by the combustion of air-fuel mixture ignited by a spark voltage generated by an ignition coil, said apparatus comprising:

sensor means sensing operating conditions of said engine and developing sensor binary signals indicative of said sensed operating conditions;

memory means memorizing a predetermined control program;

processor means responsive to said sensor means and said memory means for developing a first and second binary signals indicative of coil energization and deenergization instants defining rotational positions of said output shaft, respectively, by:

repeatedly determining said coil deenergization instant by using said sensor binary signals, discriminating whether said ignition coil has been commanded to be in an energized condition or not, discriminating whether a most recent determination of said coil deenergization instant is completed or not, determining, when both of said discrimination results are positive, an allowable coil deenergization instant by combining an actual coil energization instant and a predetermined coil energization interval required to enable said ignition coil to generate a voltage sufficient to cause said spark, further discriminating whether said most recent coil deenergization instant exceeds said allowable coil deenergization instant or not, selecting said allowable coil deenergization instant and said most recent coil deenergization instant in response to the negative and positive results of said further discrimination, respectively, and generating said second binary signal in response to said selected coil deenergization instant; and igniter means connected to said processor means and said ignition coil for energizing and deenergizing said ignition coil at the rotational positions defined by said first and second binary signals.

* * * * *